(12) United States Patent
Hasenfratz et al.

(10) Patent No.: US 9,415,337 B2
(45) Date of Patent: Aug. 16, 2016

(54) AIR FILTER ELEMENT AND AIR FILTER

(71) Applicant: MANN+HUMMEL GMBH, Ludwigsburg (DE)

(72) Inventors: Robert Hasenfratz, Waiblingen (DE); Mario Rieger, Ludwigsburg (DE); Joerg Menssen, Markgroeningen (DE); Michael Harenbrock, Ludwigsburg (DE); Duc Cuong Nguyen, Laatzen (DE); Pascal Neef, Renningen (DE); Werner Blossey, Benningen (DE); André Roesgen, Remshalden (DE); Thomas Jessberger, Asperg (DE); Pedro Miguel Pereira Madeira, Bietigheim-Bissingen (DE); Michael Heim, Freiberg (DE); Mike Schmid, Tuebingen (DE); Martin Schmid, Reisbach (DE); Gelase Mbadinga-Mouanda, Bietigheim-Bissingen (DE); Andreas Weber, Freiberg (DE); Christian Thalmann, Speyer (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 45 days.

(21) Appl. No.: 14/330,453

(22) Filed: Jul. 14, 2014

(65) Prior Publication Data

US 2015/0007535 A1    Jan. 8, 2015

Related U.S. Application Data

(63) Continuation of application No. PCT/EP2013/050588, filed on Jan. 14, 2013.

(30) Foreign Application Priority Data

Jan. 13, 2012 (DE) .......................... 10 2012 000 482

(51) Int. Cl.
*B01D 46/00* (2006.01)
*B01D 46/52* (2006.01)

(52) U.S. Cl.
CPC .......... *B01D 46/0005* (2013.01); *B01D 46/522* (2013.01); *B01D 46/523* (2013.01); *B01D 46/526* (2013.01); *B01D 46/527* (2013.01)

(58) Field of Classification Search
CPC ........ B01D 46/01; B01D 46/10; B01D 46/21; B01D 46/31; B01D 46/521–46/522
USPC ................................ 55/487, 489, 521; 96/67
See application file for complete search history.

(56) References Cited

U.S. PATENT DOCUMENTS

| 3,251,177 A | 5/1966 | Baker |
| 5,804,014 A | 9/1998 | Kahler |

(Continued)

FOREIGN PATENT DOCUMENTS

| DE | 2739815 A1 | 2/1978 |
| DE | 10135690 A1 | 2/2003 |

(Continued)

*Primary Examiner* — Jason M Greene
*Assistant Examiner* — Karla Hawkins
(74) *Attorney, Agent, or Firm* — James Hasselbeck

(57) ABSTRACT

Disclosed are an air filter element, a filter housing, and an air filter in which the air filter elements have a high filtering capacity and a long service life by increasing the filter surface of an air filter element taking into account structural requirements for the air filter housing.

17 Claims, 26 Drawing Sheets

(56) References Cited

U.S. PATENT DOCUMENTS

| | | |
|---|---|---|
| 6,955,696 B1 | 10/2005 | Ost |
| 2004/0020177 A1* | 2/2004 | Ota .................... B01D 46/0006 55/481 |
| 2004/0035096 A1 | 2/2004 | Ham |
| 2006/0021932 A1 | 2/2006 | Darnell |
| 2009/0064647 A1 | 3/2009 | Darnell |
| 2010/0011531 A1 | 1/2010 | Liddell et al. |
| 2011/0067370 A1 | 3/2011 | Schumann |
| 2011/0252759 A1 | 10/2011 | Nicholas |
| 2014/0053521 A1* | 2/2014 | Muenkel ............ B01D 46/0021 55/489 |

FOREIGN PATENT DOCUMENTS

| | | |
|---|---|---|
| DE | 102004025274 A1 | 12/2004 |
| DE | 102004005904 A1 | 9/2005 |
| DE | 202005013646 U1 | 11/2005 |
| DE | 102006009257 B3 | 7/2007 |
| DE | 202007002106 U1 | 6/2008 |
| EP | 1681085 A1 | 7/2006 |
| FR | 2911924 A1 | 8/2008 |
| WO | 2008147585 A2 | 12/2008 |

* cited by examiner

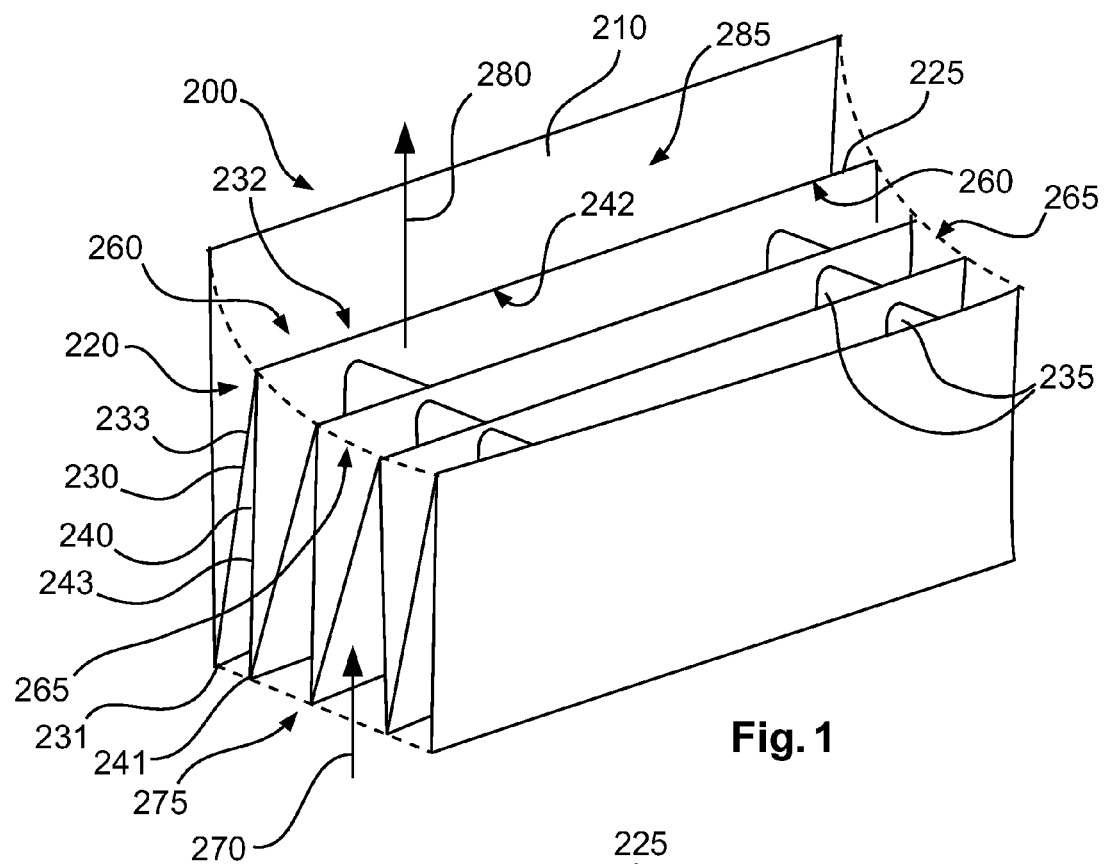
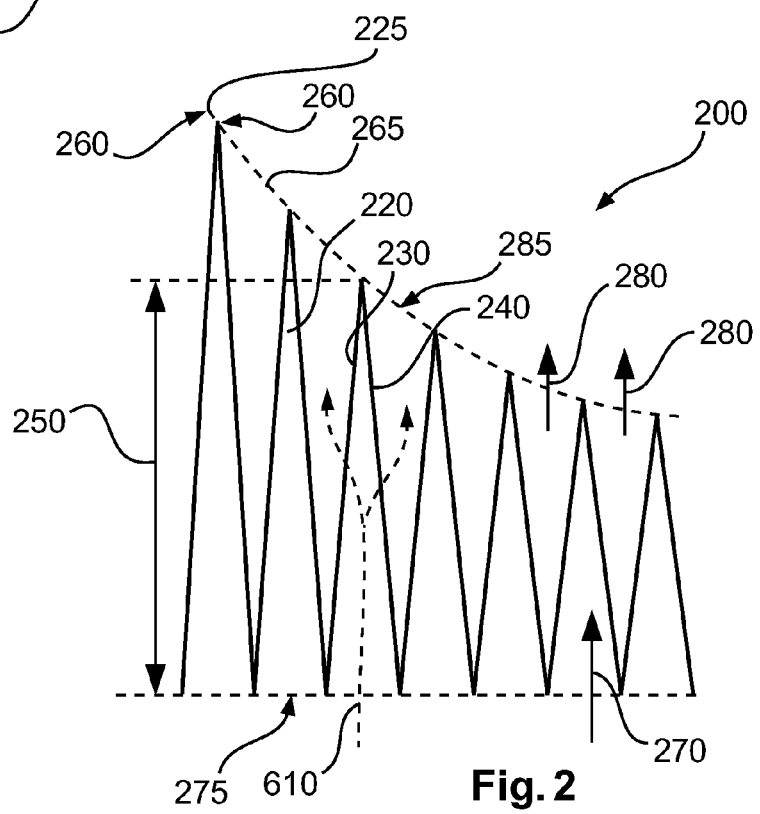

AIR FILTER ELEMENT AND AIR FILTER

CROSS-REFERENCE TO RELATED APPLICATIONS

This application is a bypass continuation application of international application No. PCT/EP2013/050588 having an international filing date of Jan. 14, 2013 and designating the United States, the international application claiming a priority date of Jan. 13, 2012, based on prior filed German patent application No. 10 2012 000 482.6, the entire contents of the aforesaid international application and the aforesaid German patent application being incorporated herein by reference.

FIELD OF THE INVENTION

Invention relates to the technical field of the preparation and filtration of air for example the air filtration in a motor vehicle, an agricultural machine, or a construction machine. In particular, the invention relates to an air filter element and an air filter.

TECHNICAL BACKGROUND OF THE INVENTION

For example, air filters are used in the air supply of internal combustion engines in order to remove pollutants and dirt particles from the air supplied for the combustion so that only purified air is supplied to a combustion process in the internal combustion engine.

An air filter has an inflow opening for unpurified, dirty air and an outflow opening for the filtered, clean air; the filter element performs the actual filtering function. The air supply of the internal combustion engine is provided via the outflow opening of the air filter; the internal combustion engine takes in the required air or air quantity. The filter element or air filter element is composed of a filter medium such as a filter paper through which the air that is to be filtered flows when the internal combustion engine sucks air in so that the dirt particles contained in the air flowing through are separated or removed in the filter medium.

Usually, the filter medium is folded (folded filter) or has a multitude of filter chambers (fluted filter) in order to increase the surface area of the filter, which also extends the service life of an air filter element since a larger filter surface area can absorb more dirt particles before the pressure drop at the filter medium caused by separated dust has become so significant that the air is no longer allowed to pass through to the internal combustion engine in the required quantity and the air can no longer pass or flow through the filter medium.

Usually, the filter element is contained in the housing and, for example, a functional element in the form of an additional filter element is provided in the housing, upstream of the outflow opening of the air filter. The additional filter element in this case performs the function of preventing dirty air from flowing into the internal combustion engine through the air filter, even if the air filter has been removed from the housing. For this reason, a main element or air filter element and a functional component must usually be placed inside the housing of the air filter.

In addition, the structural design of the housing can be adapted to external circumstances, e.g. the spatial circumstances inside the engine compartment of a motor vehicle. The structural design of the housing has a direct influence on the size of the air filter element and therefore on the filtration performance of the air filter element.

Depending on the volume inside the air filter housing occupied by the functional component, the main element or air filter element is correspondingly reduced in size and/or the depth of the air filter folds or filter chambers of the main element is adapted so as to divide up space inside the air filter housing.

Usually, the folds of the filter element are folded or the depths of the filter chambers are embodied so that they are equal in depth and thus constitute a block-shaped air filter element. This can, however, result in the fact that the functional component does not take up the entire space that the block-shaped design of the main element leaves open on the inside of the housing.

WO 98/47601 has disclosed a filter element in the form of a folded filter element for an air filter; the filter element is composed of a filter insert embodied in zigzag form.

SUMMARY OF THE INVENTION

One object of the invention can be viewed as achieving a high filtration performance and a long service life of air filter elements by enlarging the filter area of an air filter element while taking into account structural requirements of the air filter housing.

The invention discloses an air filter element and an air filter according to the features of the independent claims. Modifications of the invention ensue from the dependent claims and the following description.

Another embodiment of the invention discloses an air filter element with an upstream surface, a downstream surface, a filter medium, and a support structure; the filter medium extends between the upstream surface and the downstream surface; the filter medium is laterally fastened to the support structure between the upstream surface and downstream surface; and in the plane in which it extends, the support structure has a recessed offset, particularly in the form of an indentation, extending in the direction of the upstream surface and downstream surface.

The support structure can be made of hard plastic or plastic, in particular foamed plastic such as PU foam or PUR casting compounds, and can be welded or glued to the filter medium. The support structure can also be a nonwoven or can be a PU support structure that can contain a nonwoven or resin-reinforced nonwoven. Preferably, the support structure in particular provides a lateral sealing of the folds.

The support structure can, for example, have two plate-shaped support elements (side plates) on opposite side surfaces of the filter element.

For example, the filter medium can contain or be composed of paper, nonwoven, microfiber material, nanofiber material, or plastic or can be composed of a mixture or composite of these materials.

The recessed offset on the support structure can in particular be formed so that the recessed offset corresponds to the cross-section of the free volume; but the recessed offset can also be smaller than the free volume, which means that filter folds for example, are attached to the support structure and along the plane in which the support structure extends, are spaced a predetermined distance apart from the recessed offset; each fold edge can be spaced an individual distance apart from the recessed offset.

Thus in particular, the respective upstream surface or downstream surface can be situated behind the recessed offset in a viewing direction toward one of these surfaces. This means that in other words, the support structure protrudes beyond the filter medium, in fact so that the retaining surfaces are spaced a predetermined distance apart from the upstream surface or downstream surface, respectively.

As a result, it is possible for the support structure, for example, to be conveyed past the functional component as the air filter element is being inserted into an air filter housing and the retaining surfaces are received and held by retaining surface recesses while the filter medium is nevertheless spaced a certain distance apart from a functional component.

According to another embodiment of the invention, the support structure has a plurality of recessed offsets in the direction of the upstream surface and the downstream surface. In this case, one or several of the recessed offsets can be embodied in the form of an indentation. Preferably, at least one respective recessed offset can be situated on the opposite side surfaces of the support structure; for example, the support structure has two plate-shaped support elements (side plates) on the opposite side surfaces.

According to another embodiment of the invention, the support structure covers the filter medium laterally along the indentation. As a result, the support structure seals the filter medium at the surface of the air filter element that is oriented perpendicular to the fold edges.

According to another embodiment of the invention, the support structure has a first retaining surface and a second retaining surface; the recessed offset is embodied on the support structure between the first retaining surface and the second retaining surface of the support structure. As a result, upon insertion into an air filter housing, the first retaining surface and the second retaining surface have a greater penetration depth than the recessed offset on the support structure and filter medium, respectively, and the air filter is thus retained by the first and second retaining surface. The first retaining surface and second retaining surface can also be shaped almost in the form of a point or be embodied as point-shaped, i.e. have very small geometric dimensions of less than 1 cm$^2$.

According to another embodiment of the invention, the upstream or downstream surface of the filter medium associated with the recessed offset on the support structure extends into a region lateral to the recessed offset on the support structure. For example, the region lateral to the recessed offset on the support structure is the region between the first retaining surface or second retaining surface and the maximum depth of the recessed offset on the support structure, e.g. in the form of an indentation. Because the upstream or downstream surface extends into the region lateral to the recessed offset on the support structure or lateral to the indentation, the surface of the filter medium can be maximized despite the presence of the recessed offset or indentation.

According to another embodiment of the invention, in addition or alternatively to the first and second retaining surface, the support structure has a (third) retaining surface, which is situated in the recessed offset on the support structure. If a first and second retaining surface are provided, then the third retaining surface is also situated for example between the first retaining surface and second retaining surface. As a result, particularly in addition to the first and second retaining surface, an additional (third) retaining surface is situated, for example, in the indentation on a retaining surface recess in an air filter housing and can provide an improved positioning and fixing of the air filter element in the air filter housing.

According to another embodiment of the invention, at least one of the first, second, and third retaining surfaces absorbs a retaining force in the direction along the plane of the support structure. As a result, the retaining surface or surfaces provide(s) for a positioning or fixing of the air filter element in an air filter housing. The retaining surfaces absorb a retaining force along or parallel to the plane of the support structure, particularly in a direction in which the air flows through the air filter from the upstream surface to the downstream surface.

According to another embodiment of the invention, in at least some sections, the upstream or downstream surface associated with the recessed offset on the support structure has a one-dimensional concave or convex form; in at least some sections, the curvature of the concave or convex form corresponds to that of at least a part of the recessed offset.

The following explanations of the one-dimensional concave or convex form that can increase the filter area apply analogously to the one-dimensional concave or convex form of the recessed offset and the downstream and upstream surface.

According to another embodiment of the invention, the filter medium is a folded filter medium composed of folds; the folds each have a first fold leaf and second fold leaf, which adjoin each other at a fold leaf edge by means of respective fold leaf edges and the first fold leaves of adjacent folds lie essentially parallel to each other; the first and second fold leaves extend between the upstream surface and the downstream surface; and the support structure laterally supports the fold leaves at the fold leaf edges that do not adjoin respectively adjacent fold leaf edges.

The fact that the respective first fold leaf edges of adjacent folds are oriented essentially parallel to one another means that the folds are oriented in essentially the same direction, which in turn means that the direction of air flow through the folds extends in essentially the same direction.

According to another embodiment of the invention, the fold leaves are laterally embedded in the support structure at the fold leaf edges that do not adjoin fold leaf edges of respectively adjacent filter leaves. This can result in an increased mechanical strength of the air filter element since the fold leaves are connected to the support structure in a form-fitting manner.

According to another embodiment of the invention, the upstream or downstream surface associated with the recessed offset has a shape that corresponds to at least a part of the recessed offset of the support structure, in that it is provided with a plurality of folds of varying fold depths.

At least some of the plurality of folds with varying fold depths are advantageously produced from a continuous filter medium web. It is therefore unnecessary to combine several partial filters to produce an air filter element and, because of the variable fold depth of the folds in comparison to one another, it is possible, for example, to produce a curved upstream or downstream surface.

According to another embodiment of the invention, adjacent fold leaves are reciprocally stabilized by at least one spacer device. The spacer device can in particular be made of a plastic. For example, the molten plastic for producing the spacer device is applied to the filter medium. Preferably, the spacer device has glue beads or glue lines. The spacer device, in particular the glue lines, is/are situated on the downstream and/or upstream side of the filter medium.

The spacer device or glue lines can be arranged perpendicular or diagonal to the upstream surface or downstream surface. In addition, the glue lines or glue beads can have a continuous glue bead or a broken or dotted glue bead and can be composed of a plurality of glue bead segments. In this case, the glue line segments or glue bead segments can be offset from one another so that the broken bead encloses an angle of between 1° and 90° with the fold edges and/or the upstream surface or downstream surface.

The spacer device in this case can, for example, ensure that the fold leaves maintain a certain distance from one another and in particular, the spacer device can cause an opening angle of the filter folds to remain the same. This can facilitate a uniformly high filtration performance of the air filter element since the fold openings can change by only a small amount due to the presence of the glue lines. In particular, the spacer device, particularly in the form of glue lines, can prevent the fold openings from getting smaller. The fold leaves of a filter fold can only move toward each other by a reduced amount due to the presence of the spacer device inserted between them.

According to another embodiment of the invention, the spacer device, particularly in the form of glue beads or glue lines, extends parallel to the fold leaf edges that do not adjoin fold leaf edges of respectively adjacent filter leaves. As a result, in at least some sections, the spacer device extends in a direction from the upstream surface to the downstream surface and vice versa and parallel to the support structure. In this way, it presents the least possible obstruction to the air flow.

Another embodiment of the invention discloses an air filter with an air filter housing and an air filter element as described above and below; the air filter housing has a first air flow opening and an air filter element receptacle; the air filter element receptacle has a retaining surface recess; and the retaining surface recess is in contact with at least a region of the support structure in a manner that transmits a retaining force.

The air filter element receptacle is embodied to position the air filter element relative to the air filter housing in that for example the recessed offset on the support structure is received and guided by the air filter element receptacle as the air filter element is being inserted into the air filter housing so that a desired position of the air filter element is achieved. In this case, the air filter element receptacle can be embodied to merely contact the retaining surfaces of the support structure and to thus hold and position the air filter element.

According to another embodiment of the invention, the retaining surface recess engages with at least one or both of the first retaining surface and second retaining surface in such a way that the engagement absorbs a retaining force in the direction along the plane of the flat support structure. The air filter element is thus fixed in its position in a direction of the air flow.

According to another embodiment of the invention, the retaining surface recess engages with at least the third retaining surface in such a way that the engagement absorbs a retaining force in the direction along the plane of the flat support structure.

The explanations with regard to the first retaining surface and second retaining surface apply analogously to the third retaining surface.

According to another embodiment of the invention, the air flow opening of the air filter housing at least partially feeds into the recessed offset of the support structure.

The air flow opening can be situated anywhere on the air filter housing and the design of the recessed offset of the support structure can be used to ensure that a specific, low-resistance air guidance and air flow occurs from the air flow opening, into the air filter housing, and to the air filter. This applies analogously to both the inflow opening and the outflow opening as well as to the air filter housing.

According to another embodiment of the invention, the air filter housing has a protrusion; the recessed offset of the support structure, particularly in the form of an indentation, engages in a position-establishing fashion with the protrusion in the air filter housing. The protrusion on the air filter housing can exert a retaining force on the recessed offset or indentation and on the support structure, as has also been described above for the air filter element receptacle.

According to another embodiment of the invention, the air filter also has a functional component; the functional component protrudes into the recessed offset.

The air filter element and the air filter, as described above and below, are in particular used for air filtration in motor vehicles, construction machines, or agricultural machines. In particular, they are used for filtering the intake air of an internal combustion engine or filtering the intake air of a vehicle's passenger compartment. They can, however, also be embodied in a modified way so that they can also be used for other fluids, in particular for liquids and liquid mixtures. In this regard, they can in particular be largely the same in structure, but embodied as fuel or oil filter elements for motor vehicles or as fuel or oil filters for motor vehicles.

The individual features can naturally be combined with one another, sometimes achieving advantageous effects that go beyond the sum of their individual effects.

Exemplary embodiments of the invention will be described below with reference to the drawings.

BRIEF DESCRIPTION OF THE DRAWINGS

FIG. 1 is an isometric depiction of an air filter element according to an exemplary embodiment of the invention.

FIG. 2 shows a side view of an air filter element according to an exemplary embodiment of the invention.

Figure 3:
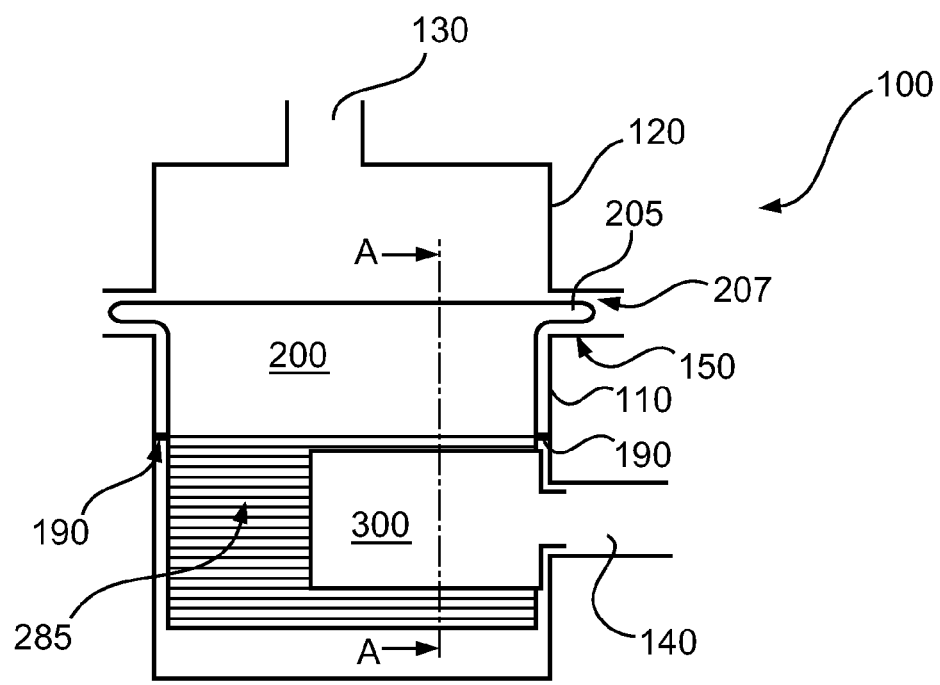
FIG. 3 shows a sectional view of an air filter according to an exemplary embodiment of the invention.

The depictions in the figures are schematic and not true to scale.

DETAILED DESCRIPTION OF THE EXEMPLARY EMBODIMENTS

Wherever the same reference numerals are used below, these refer to elements that are the same or similar.

FIG. 1 shows an air filter element 200 or main element 200 of an air filter. The air filter element 200 has a plurality of filter folds 220; each filter fold 220 is composed of a first fold leaf 230 and a second fold leaf 240. The filter folds 220 or the first fold leaves 230 and second fold leaves 240 here extend in a direction from the inflow direction 270 to the outflow direction 280 or vice versa. The fold edge 225 of each filter fold 220 extends perpendicular to the inflow direction 270 and outflow direction 280. The fold edge 225 here constitutes the transition from a first fold leaf to a second fold leaf and is formed at both the upstream surface 275 and the downstream surface 285 of the air filter element 200.

The fold edge 225 at the upstream side or upstream surface 275 is formed by an upstream fold leaf edge 231 of the first fold leaf 230 and an upstream fold leaf edge 241 of the second fold leaf 240. Analogously, a fold edge 225 at the downstream surface 285 is formed by a downstream fold leaf edge 232 of the first fold leaf 230 and a downstream fold leaf edge 242 of the second fold leaf 240.

A fold leaf edge 260, i.e. the upstream fold leaf edge 231 or downstream fold leaf edge 232 of the first fold leaf 230 or the upstream fold leaf edge 241 or downstream fold leaf edge 242 of the second fold leaf 240, is formed by the fact that a fold leaf meets up with the filter fold by means of the fold edge of the fold leaf, i.e. the fold edges of two fold leaves form the filter fold 220.

A lateral fold leaf edge 233 of the first fold leaf 230 and a lateral fold leaf edge 243 of the second fold leaf 240 extend from the upstream surface 275 to the downstream surface 285.

The filtering action of the air filter element 220 is achieved by the fact that a filter medium is used to form the filter folds 220 and unpurified air—so-called dirty air—flows in the inflow direction 270 against the upstream surface 275 and passes through the filter medium in the direction toward the downstream surface 285 in the outflow direction 280 and in so doing, is cleaned so that clean air is present at the downstream surface 285.

The fold edges 225 of all of the filter folds 220 at the upstream surface 275 and downstream surface 285, respectively, form a so-called envelope 265; the one envelope 265 can in particular be an enveloping surface of the fold edges at the upstream surface or downstream surface.

The fold edges 225 span the upstream surface and downstream surface alike; the envelope corresponds to the one of these two surfaces that spatially encloses or surrounds a functional component.

In this case, this is a connecting line of the fold edges 225 at the downstream surface 285 or at the upstream surface 275; the connecting line extends perpendicular to the fold edges and in particular, the connecting line, together with the downstream surface or upstream surface, forms a one-dimensional concave surface or form.

In this case, a one-dimensional concave surface has only one curvature in one direction. For example, this curvature of the one-dimensional concave surface in one direction is produced by the fact that the fold depths of adjacent filter folds steadily decrease or steadily increase so that the fold edges 225 have a variable distance from the respective opposite surface, i.e. the upstream surface 275 or downstream surface 285. The envelope 265 and the fold edges 225 thus form a one-dimensionally curved concave surface since the one-dimensional concave surface is curved in the direction of the envelope 265, but has no curvature in the direction of the shape of the fold edges 225.

Glue lines 235 extend in the folds in a direction from the upstream surface to the downstream surface and provide for an increased stability of the filter medium.

FIG. 2 shows a side view of an air filter element 200 with a plurality of filter folds 220. The envelope 265 at the downstream surface 285 is embodied by the fact that the fold edge 225 of each filter fold 220 is spaced a different distance apart from the upstream surface 275. The so-called fold depth 250 here extends in the direction of the envelope 265, steadily decreasing or increasing, depending on the direction from which it is viewed. Adjacent filter folds can, however, naturally have the same fold depth 250.

In other exemplary embodiments, however, the envelope 265 can also be embodied so that the fold depth of adjacent filter folds first decreases and then increases again. Generally, the envelope 265 can assume any shape and in so doing, can be embodied so that an upstream surface 275 or downstream surface 285 of the air filter element 200 corresponds to or is adapted to the external circumstances dictated by the design of an air filter or air filter housing.

As shown in FIG. 2, the dirty air flows in the inflow direction 270 against the upstream surface 275, then penetrates into the filter folds 220, is distributed along the air flow direction 610 so that the air on the inflow side passes through the first fold leaf 230 and the second fold leaf 240 of each filter fold 220 and is thus filtered so that the filtered air exits the air filter element 200 at the downstream surface 285 in the outflow direction 280; the air on the downstream side of the air filter element 200 is referred to as clean air.

FIG. 3 shows a sectional view of an air filter 100; the air filter 100 has a housing body 110 and a housing cover 120, which together constitute the housing of the air filter.

Inside the housing, there are an air filter element 200 and a functional component 300, both arranged for filtering the air flowing through. The air filter element 200 is situated in the housing body 110, is retained by two retaining surface recesses 190, and fixes the position of the air filter element 200 inside the housing body 110. The air filter element 200 also has a seal 205, which at least provides a sealed closure of the housing body 110 with the air filter element. In addition, the seal 205 can provide a seal between the housing body 110 and the housing cover 120 and/or between the air filter element 200 and the housing cover 120. The seal 205 can be positioned or fastened to both the air filter element 200 and the housing body 110 or housing cover 120.

It is essential to the function of the seal 205 that unfiltered air be permitted to travel through the air filter element 200 and arrive at the clean air connection 140. The seal should also seal the housing of the air filter 100, at least to a large extent. This means that air passes through the dirty air connection 130 or first inflow opening 130 into the housing of the air filter 100, passes through the air filter element 200 and functional component 300 contained therein, and exits the housing of the air filter as filtered, clean air at the clean air connection 140 or outflow opening 140 of the air filter 100.

The seal 205 in this case is situated between the housing body 110, the housing cover 120, and the air filter element 200 to prevent unfiltered air from penetrating into the housing of the air filter, which would allow it to exit the housing at the clean air connection 140 without flowing through the filter medium of the air filter element 200 and being cleaned.

The housing body 110 has an air filter element receptacle 150 in which a so-called filter collar 207 can engage. The filter collar 207 is embodied so as to mechanically affix the air filter element 200 to the housing body.

The air flow of the air, which is to be cleaned and filtered in the air filter 100 shown in FIG. 3, travels via or through the dirty air connection 130, the air filter element 200, the functional component 300, and the clean air connection 140. In the process, the air is cleaned essentially by the air filter element 200, exits the latter at the downstream surface 285, and then exits the housing of the air filter 100 via the functional component 300.

The functional component 300 here can be an additional filter element or another functional component that is accommodated inside the housing of the air filter 100.

Figure 4:
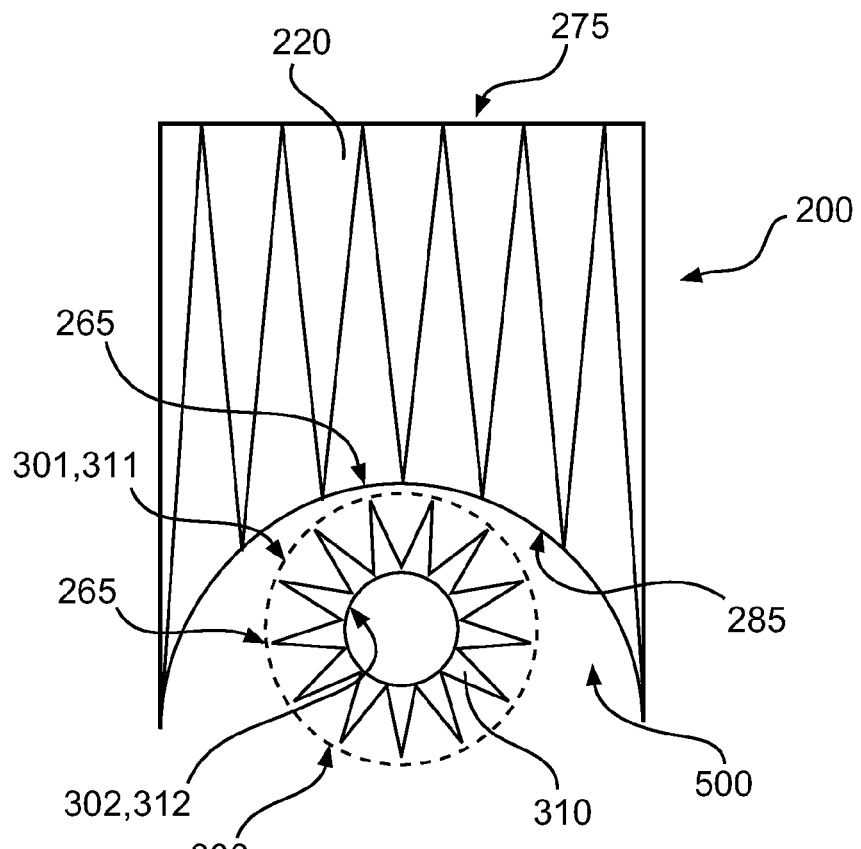
FIG. 4 shows a sectional view of an air filter element and a functional component according to an exemplary embodiment of the invention.

FIG. 4 shows a sectional view of a main element 200 or air filter element 200 and a functional component 300 in the form of an additional filter element 310 folded in a star shape, viewed along the section line A-A from FIG. 3. In particular, FIG. 4 shows that the functional component 300 is adapted to fit in or against the envelope 265 of the air filter element 200.

In this case, both the main element 200 and the functional component in the form of an additional filter element 310 have filter folds 200 with variable fold depths; the fold depth of the respective filter folds are matched to one another so that the envelope 265 of the downstream surface 285 of the air filter element 200 corresponds to the envelope 265 of the upstream surface 301 of the functional component 300 or the upstream surface 311 of the additional filter element 310.

The air flow through the main element 200 and the functional component 300 is routed so that the air to be cleaned at the upstream surface 275 of the main element 200 penetrates into this upstream surface, then exits the main element 200 at the downstream surface 285, and then at the upstream surface 311 of the additional filter element 310 penetrates into the additional filter element and exits the latter at the downstream surface 312.

Figure 5A:
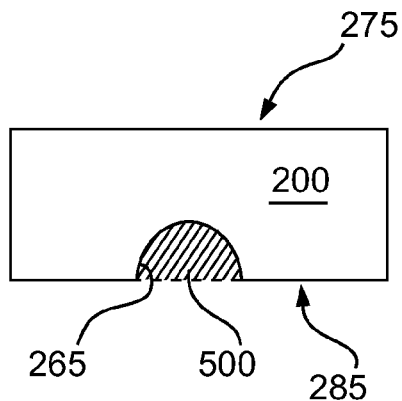
FIG. 5A shows a cross section through an air filter element according to an exemplary embodiment of the invention.

FIG. 5A shows a cross-section through an air filter element 200; the downstream surface 285 has a semicircular free volume; the semicircular free volume excludes only a part of the downstream surface 285 and this semicircular free volume is formed by the envelope 265.

Figure 5B:
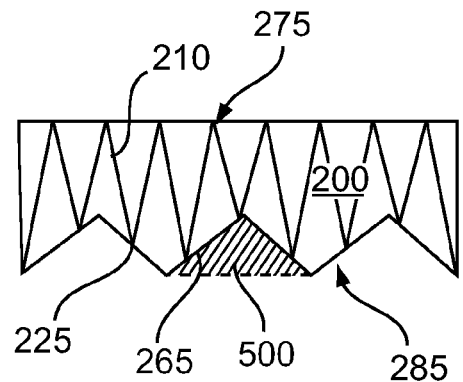
FIG. 5B shows a cross section through an air filter element according to an exemplary embodiment of the invention.

FIG. 5B shows the cross-section of an air filter element 200; the downstream surface 285 has a sawtooth-shaped cross-section. The sawtooth-shaped cross-section here extends over the entire width of the air filter element 200. The envelope 265 connects the fold edges 225 of the filter folds of the filter medium 210.

It should in particular be noted that the number of filter folds is not predetermined or influenced by the shape and cross-sectional dimensions of the downstream surface 285, i.e. the shape of the envelope 265.

As shown in FIG. 5B, in all of the exemplary embodiments described above and below, the air filter element 200 can have a multitude of filter folds; the filter folds and the number of filter folds are not preset or determined by the shape or cross-section of the envelope 265.

Figure 5C:
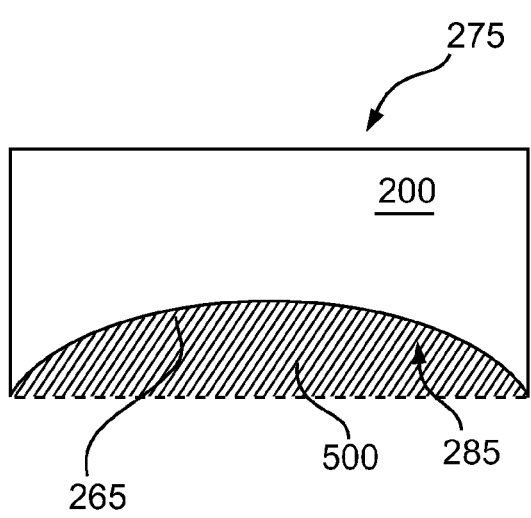
FIG. 5C shows a cross section through an air filter element according to an exemplary embodiment of the invention.

FIG. 5C shows an elliptical, semicircular shape of the envelope 265 of the downstream surface 285 of the air filter element 200. In this case, the semicircular, elliptical shape of the envelope 265 extends across the entire width of the air filter element 200 and across the entire width of the downstream surface 285.

Figure 5D:
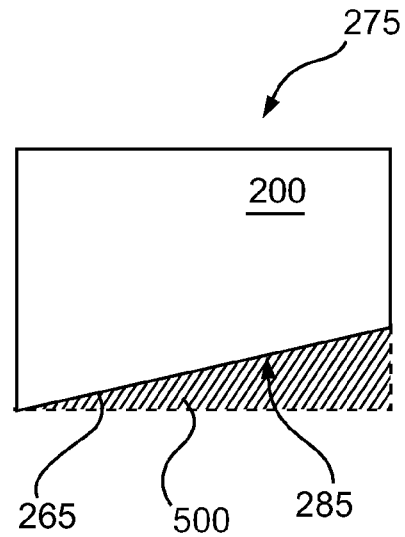
FIG. 5D shows a cross section through an air filter element according to an exemplary embodiment of the invention.

FIG. 5D shows an air filter element 200 whose downstream surface 285 extends in such a way that a filter fold depth steadily decreases or increases in one direction of the envelope 265. In this case, the envelope 265 of the fold edges at the downstream surface can extend in the form of a hyperbola, thus producing a concave form of the downstream surface 285. The envelope can, however, also extend in a line, i.e. the envelope has no curvature and is therefore an envelope line.

Figure 5E:
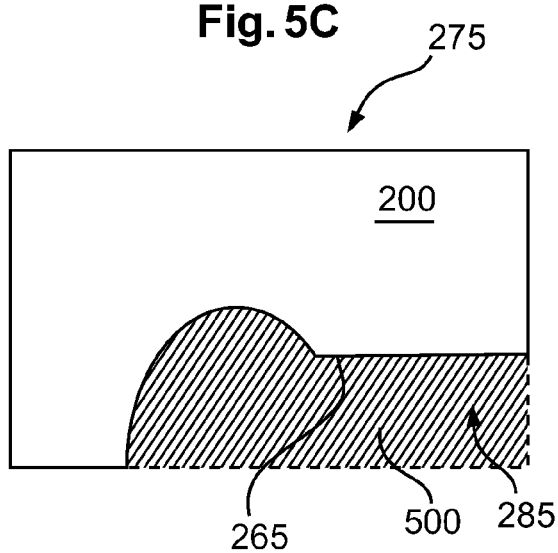
FIG. 5E shows a cross section through an air filter element according to an exemplary embodiment of the invention.

FIG. 5E shows an air filter element 200 whose downstream surface 285 is stepped; the steps of the downstream surface 285 are connected to one another via a semicircular shape of the envelope 265.

Figure 5F:
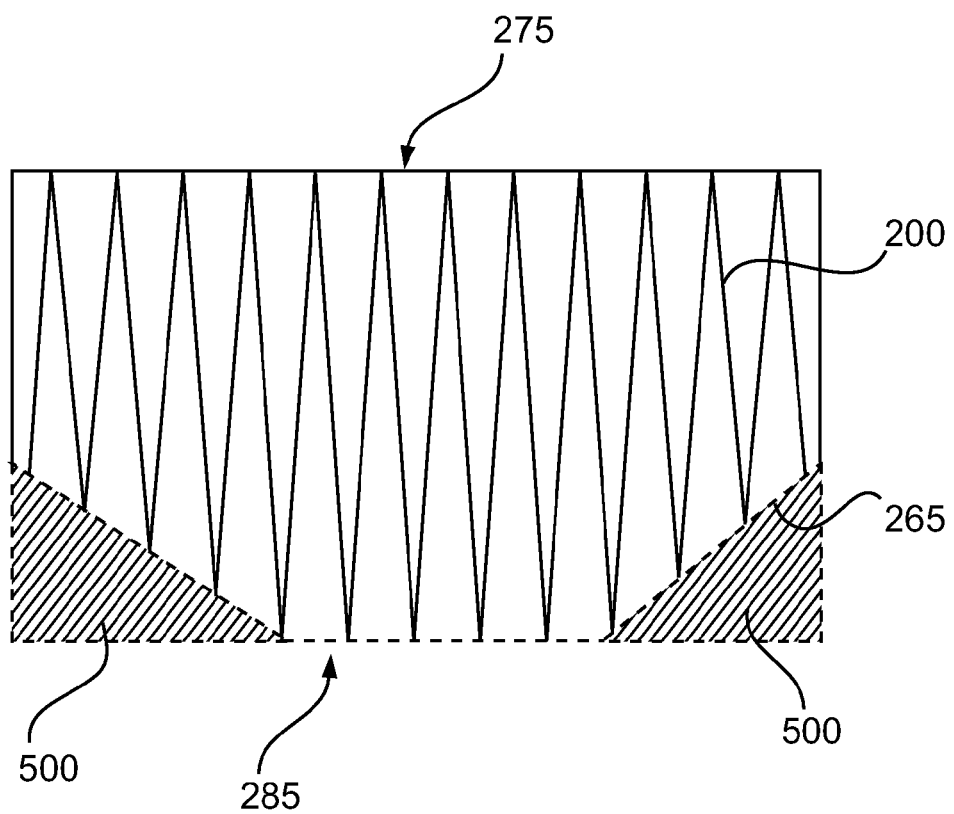
FIG. 5F shows a cross section through an air filter element according to an exemplary embodiment of the invention.

FIG. 5F shows an air filter element 200 whose downstream surface 285 extends trapezoidally in such a way that the filter fold depth of the middle filter folds 220 is greater than the fold depth of the filter folds at the edge of the cross-sectional depiction. Here, in the regions of increasing fold depth starting from the edges toward the middle of the air filter element 200, the envelope 265 of the downstream surface can extend in a linear or curved fashion.

Figure 5G:
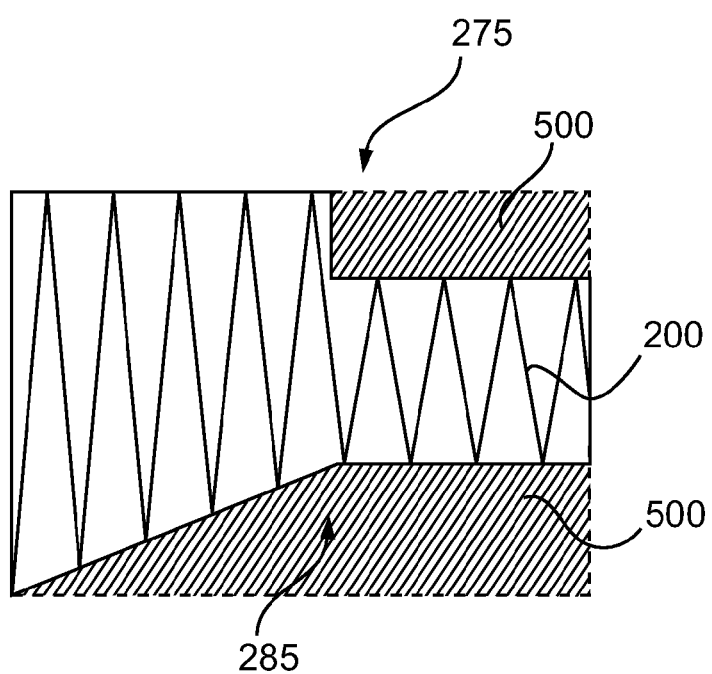
FIG. 5G shows a cross section through an air filter element according to an exemplary embodiment of the invention.

FIG. 5G shows an air filter element 200 whose upstream surface 275 has a stepped shape and whose downstream surface 285 has a region with a fold depth that decreases in linear fashion and a region with a constant fold depth. As a result, the envelope has a trapezoidal shape; the trapezoidal shape of the envelope can be symmetrical or asymmetrical.

As shown in FIGS. 5F and 5G, the upstream surface 275 and downstream surface 285 can have any shape or any envelope of the fold edges.

The shapes of the upstream surface 275 and downstream surface 285 as shown in FIGS. 5A through 5G can also be used in fluted filters.

The cross-sections of the air filter element 200 shown in FIGS. 5A through 5G and the shapes of the envelope 265 are exemplary, non-exhaustive enumerations of possible forms of the envelope 265. Instead, a continuously variable fold depth of the filter folds can produce any shape of the envelope 265 of the fold edges at the upstream surface 275 or downstream surface 285, but it is also possible at both the downstream surface 285 and upstream surface 275 to produce any desired shape of the envelope 265 on the corresponding surface.

FIGS. 5A through 5G each show the free volume or free volumes 500 as shaded areas; the free volumes of each are embodied so that they describe the spatial difference relative to a block-shaped air filter element, starting from one of the air filter elements as described above and below.

Figure 6:
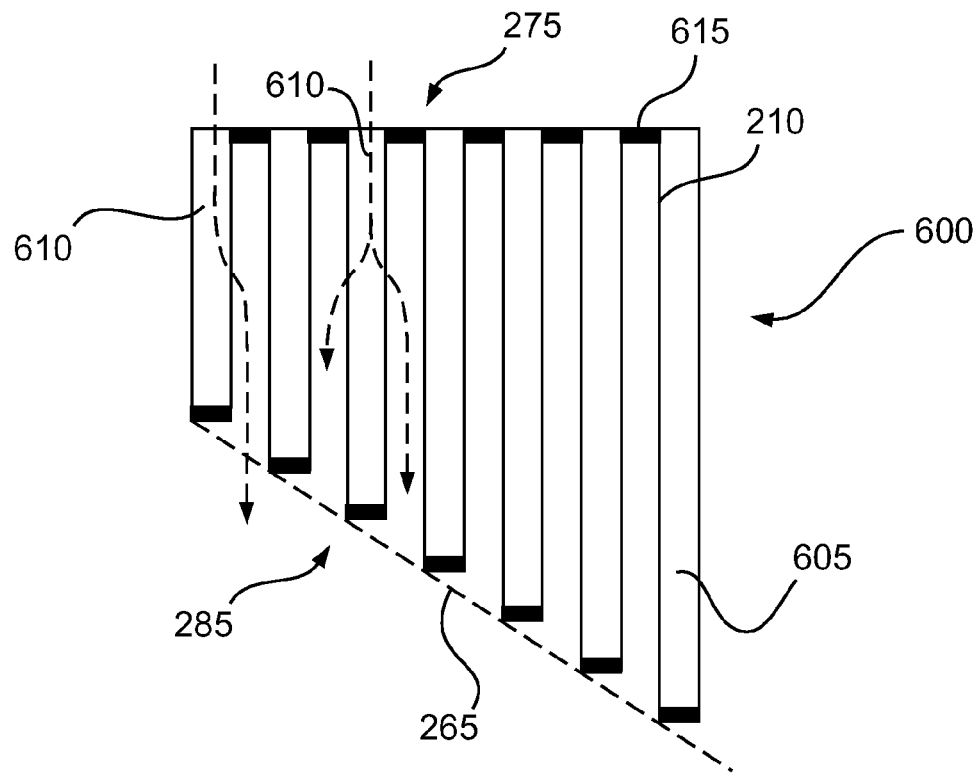
FIG. 6 shows a cross section through a fluted filter according to an exemplary embodiment of the invention.

FIG. 6 shows a side view of a fluted filter element 600; the downstream surface 285 extends along the envelope 265 so that the filter chambers 605 each have a different filter chamber depth.

The fluted filter element 600 is characterized by the fact that the filter chambers 605 are open and closed in alternating fashion on the upstream surface 275 and downstream surface 285. As a result, the air flow direction 610 extends through the fluted filter element 600 so that the incoming air on the upstream surface 275 penetrates into the filter chambers 605 that are open toward the upstream surface 275, then penetrates through the filter medium 210 into the adjacent filter chambers 605, which are closed on the upstream surface and are open on the downstream surface 285, where the air exits the fluted filter element 600.

The upstream surface 275 in a fluted filter element is composed of the upstream openings of the filter chambers and analogously, the downstream surface 285 is composed of the downstream openings of the filter chambers.

In the depiction shown in FIG. 6, the filter chambers 605 of the fluted filter element 600 are distinguished in particular by the fact that they have different filter chamber depths in a direction from the upstream surface 275 to the downstream surface 285.

Figure 7:
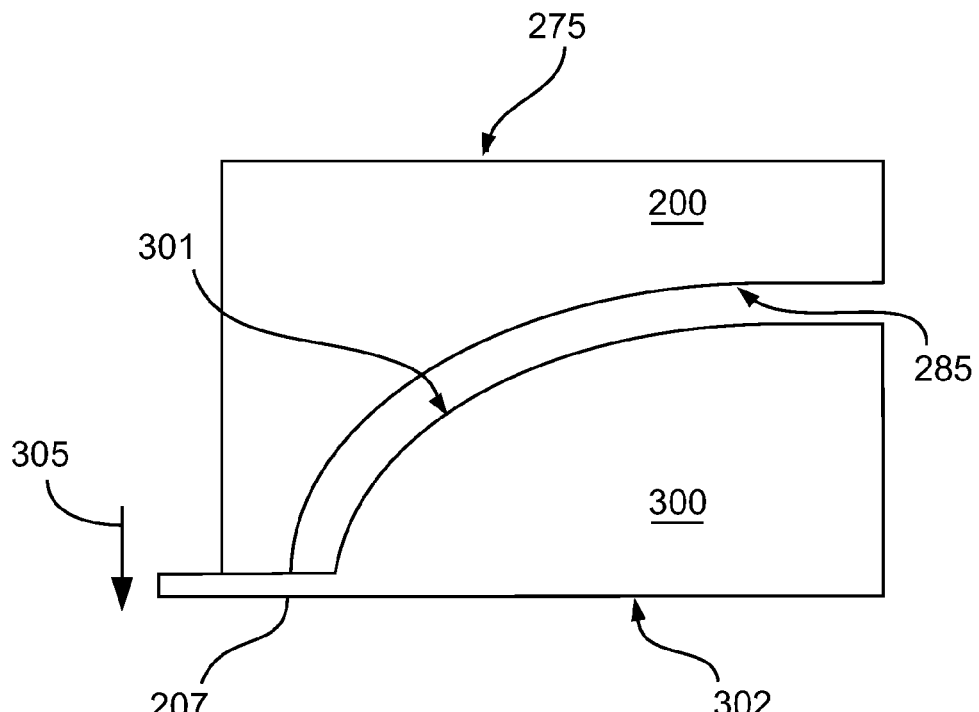
FIG. 7 shows an air filter element and a functional component according to an exemplary embodiment of the invention.

FIG. 7 shows an air filter element 200, which is functionally related to the functional component 300 such that the air filter element 200 on the downstream surface 285 is shaped so that at least a part of the air filter element 200 presses and fixes the filter collar 207 of the functional component 300 along a pressing direction 305.

This makes it possible, for example, to hold the functional component in its position inside the housing of the air filter or to position it there in the first place.

The envelope of the downstream surface 285 of the air filter element 200 and the envelope of the upstream surface 301 of the functional component 300 are each formed so that they have a corresponding or analogous shape. In particular, this ensures that the volume or space of the housing of the air filter is efficiently used and the main element 200, the functional component 300, and the additional filter element 310 have the largest possible filter area, i.e. the largest possible surface area of the filter medium.

Figure 8:
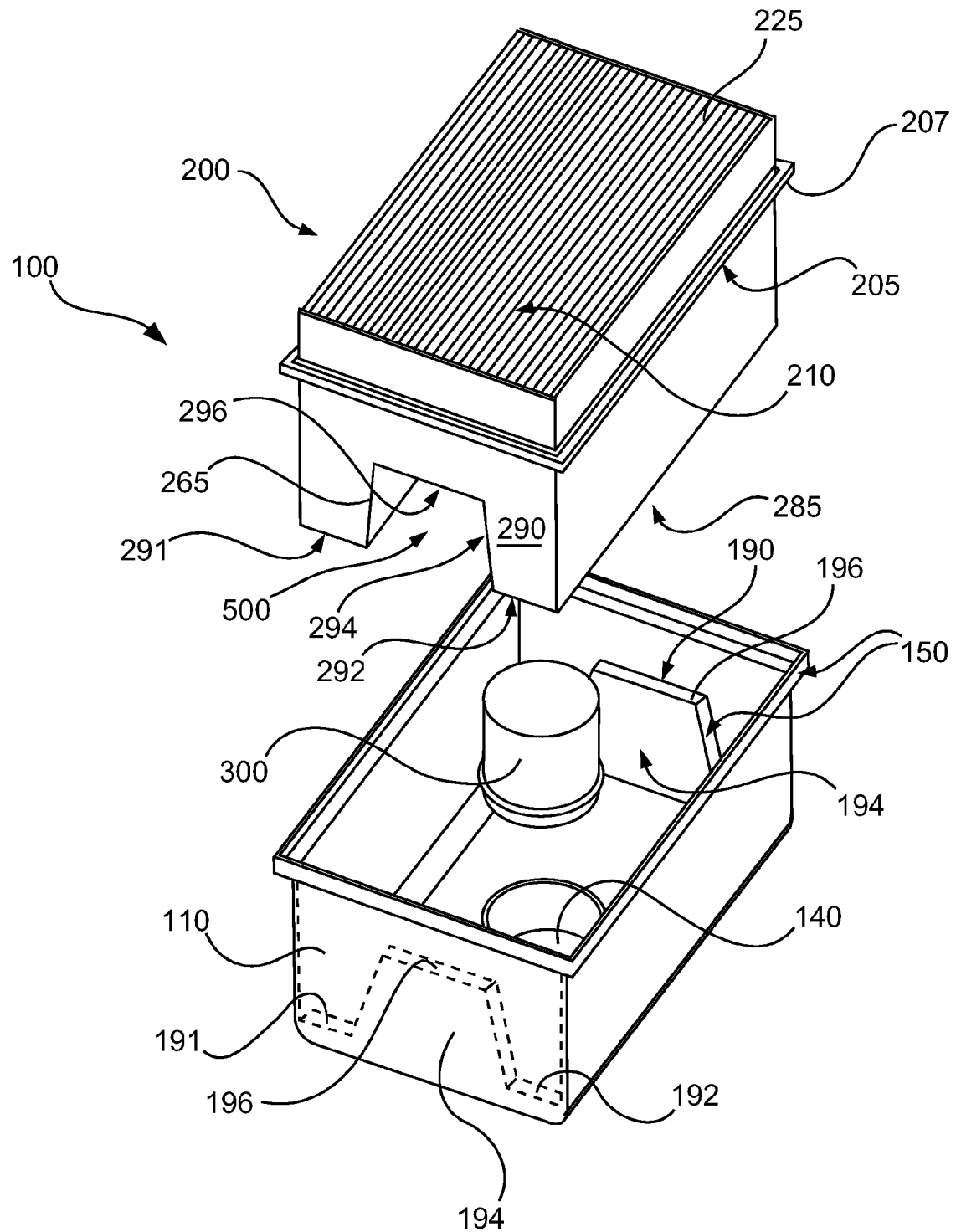
FIG. 8 shows an isometric, exploded view of an air filter with an air filter element, a housing, and a functional component according to an exemplary embodiment of the invention.

FIG. 8 shows an isometric view of an air filter element 200, a functional component 300, and a housing body 110 of an air filter.

The air filter element 200 has a circumferential filter collar 207, which engages in the air filter element receptacle 150 of the housing body 110 when the air filter element is inserted into the housing body. The air filter element receptacle 150 likewise engages in the indentation 294 of the support element. At the filter collar 207 and air filter element, a seal 205 is also mounted along the filter collar so that the seal 205 seals the housing body 110 against the housing body 110 upon insertion of the air filter element 200.

The air filter element 200 has a filter medium 210 and this filter medium is folded so that a free volume 500 is formed at the downstream surface of the air filter element in the direction of the functional component 300; the envelope 265 surrounds the free volume 500.

A support element 290 or the support structure 290 with the indentation 294 extends perpendicular to the fold edges 225 of the filter medium 210 in order to close the filter folds in a sealed fashion at their lateral openings so that no unfiltered air can flow past and bypass the filter folds of the filter. Another purpose of the support element 290 or support structure 290 is to stabilize the air filter element 200 and the filter medium 210. The support element 290 also makes it possible to position and fix the air filter element 200 during its insertion into the housing body 110 and after the insertion into the housing body 110.

The retaining surface recess 190 of the housing protrusion 194 positions the air filter element 200; the retaining surface recess 190 is adapted to the shape of the envelope 265 of the air filter element 200 or of the indentation 294. Upon insertion of the air filter element 200 into the housing body 110, the retaining surface recess 190 engages in the indentation 294 of the support element 290 and positions and fixes the air filter element in the housing body.

The retaining surface recess 190 can, for example, be situated on the housing protrusion 194; the housing protrusion can be a recess of the housing body wall from the outside inward so that this recess engages in the free volume 500 or in the indentation 294.

The support element 290 also has a first retaining surface 291, a second retaining surface 292, and a third retaining surface 296; the first retaining surface 291 is embodied to be received by a retaining surface recess 191 in the housing body 110; the second retaining surface 292 is embodied to be received by a retaining surface recess 192; and the third retaining surface 296 is embodied to be received by a retaining surface recess 196 in the housing body.

As a result, when the air filter element is inserted into the housing body, the air filter element 200 rests via the retaining surfaces 291, 292 on or against the retaining surface recesses 191, 192 in the housing body 110.

The functional component 300 is embodied in the form of a circular cylinder and protrudes from the outflow opening 140 into the interior of the housing body 110. In this case, an axial direction of the functional component 300 extends parallel to the outflow direction at the downstream surface 285 of the air filter element 200 and parallel to an axial direction of the outflow opening 140. In addition, the outflow direction at the downstream surface 285 of the air filter element 200 is parallel—or at least at an acute angle—to an axial direction of the outflow opening 140. That is, the axial direction of the functional component extends in the direction of the filter edges of the downstream surface of the main element 200. In other words, the outflow opening 140 is therefore situated on the housing body 110 facing the downstream surface 285 of the air filter element 200. As a result, a main air flow direction between the air filter element 200 and the outflow opening 140 is not changed and remains the same when the air flows via the downstream surface and through the outflow opening.

The air filter element has the free volume 500 in order to provide space for the functional component on the interior of the housing body when the air filter element 200 is inserted.

Figure 8A:
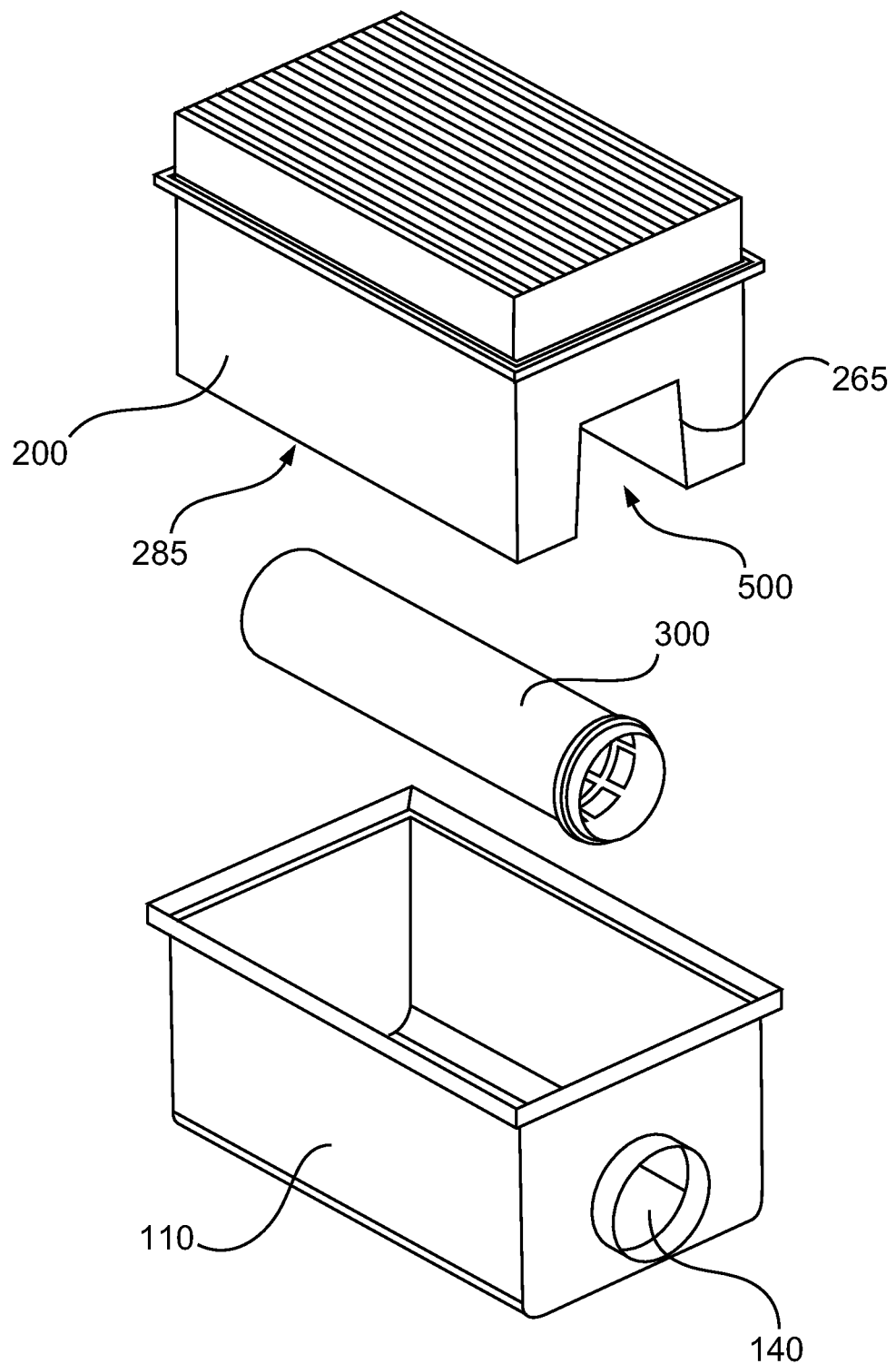
FIG. 8A is an isometric depiction of an air filter with an air filter element, a housing, and a functional component according to an exemplary embodiment of the invention.

FIG. 8A shows an air filter element 200, a functional component 300, and a housing body 110. The functional component is a cylinder with a circular base whose axial direction extends parallel to the shape of the filter edges of the downstream surface 285.

The outflow opening 140 in this case is situated on a wall of the housing body 110 so that starting from the downstream surface 285, the air flow must be deflected in order to pass through the outflow opening 140.

Figure 9:
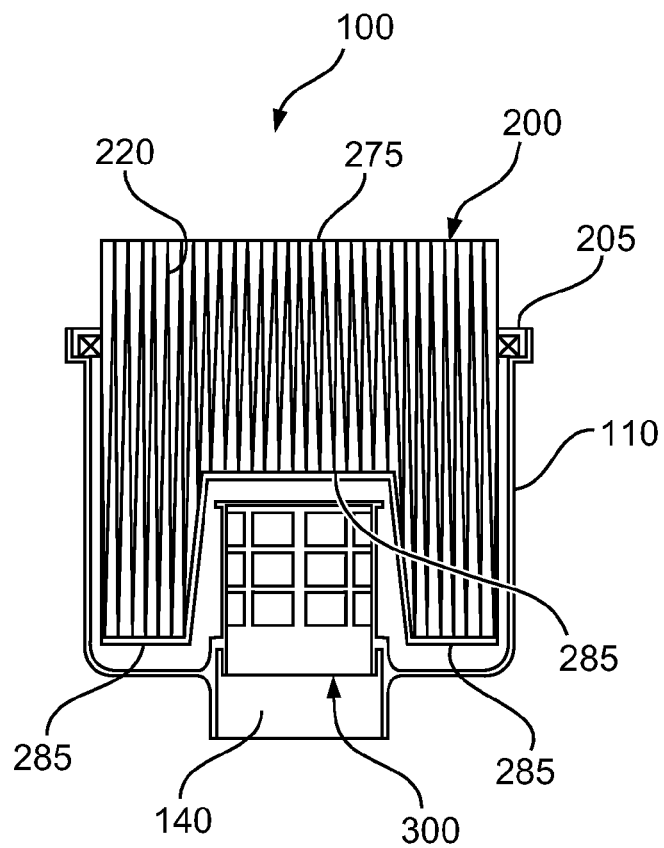
FIG. 9 shows a sectional view of an air filter according to an exemplary embodiment of the invention.

FIG. 9 shows a sectional view of a housing body 110 with an air filter element 200 and a functional component 300 of the kind shown in FIG. 8; the functional component and the air filter element are inserted into the housing body.

The functional component 300 is placed against the outflow opening 140 in a sealed fashion. As a result, air exiting the air filter element 200 at the downstream surface 285, must flow through the functional component in order to be able to exit the housing body via the outflow opening 140.

The air filter element 200 connected to the housing body 110 in a sealed fashion by means of the seal 205 and the filter folds 220 each have a respective fold depth in such a way that the filter folds enclose the functional component 300.

It should in particular be noted that the fold edges or each fold edge in and of itself do/does not have a curved shape, i.e. the fold edges extend perpendicularly into or out of the plane of the drawing.

Figure 9A:
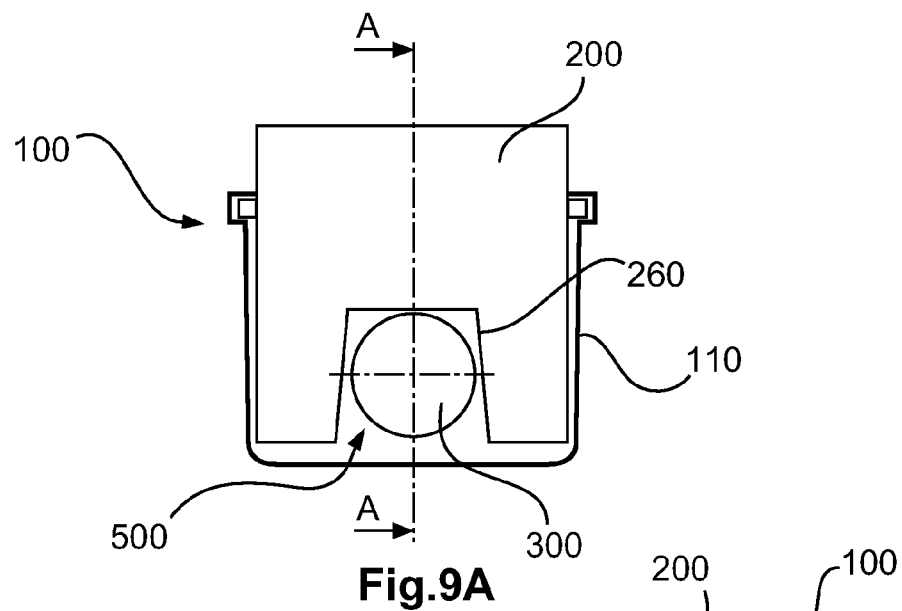
FIG. 9A shows a sectional view of an air filter according to an exemplary embodiment of the invention.

FIG. 9A shows a sectional view of a housing body 110 with an air filter element 200 and a functional component 300 as shown in FIG. 8A; the functional component and air filter element are inserted into the housing body.

In this case, the functional component extends in the free volume 500 of the air filter element, parallel to the filter edge shape on the downstream surface 285, i.e. in a direction extending out from the plane of the drawing or in a direction extending into the plane of the drawing.

Figure 9B:
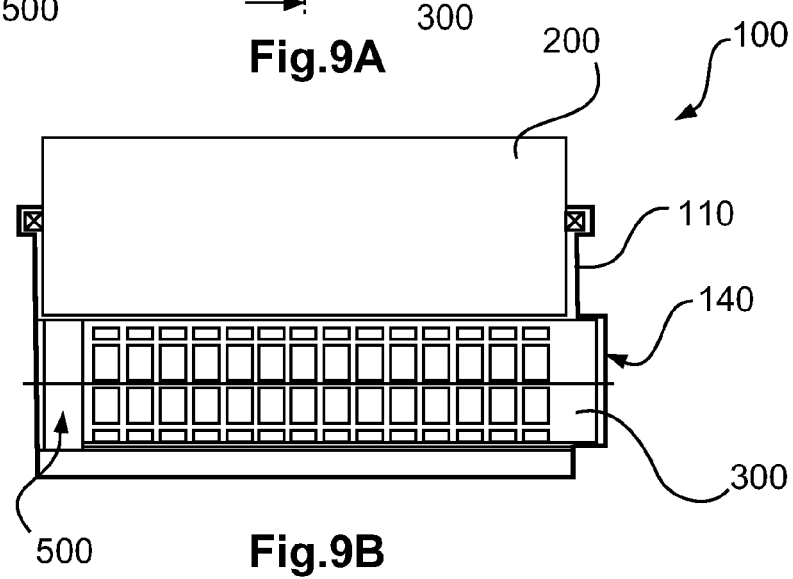
FIG. 9B shows a sectional view of an air filter according to an exemplary embodiment of the invention.

FIG. 9B shows a sectional depiction along the section line A-A from FIG. 9A.

As is clearly evident, the functional component extends in the free volume 500. In this case, the functional component can have any length inside the free volume 500; the greatest possible use of the three-dimensional volume of the free volume 500 by the functional component is accompanied by an increased surface area of the functional component, for example a filter area of an additional filter element, which makes it possible to improve the overall functional performance of the functional component or additional filter element.

Figure 10:
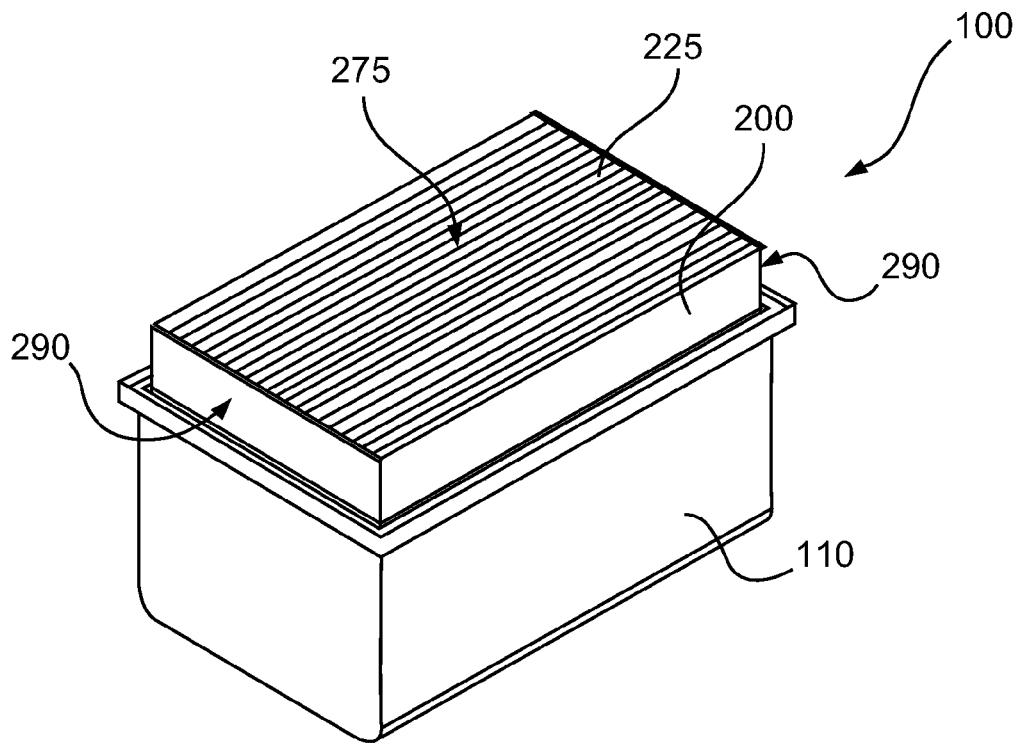
FIG. 10 is an isometric depiction of an air filter according to an exemplary embodiment of the invention.

FIG. 10 shows an isometric view of a housing body with an inserted air filter element 200. The air filter element 200 has two support elements 290, which are each situated laterally on the air filter element 200 and perpendicular to the fold edges 225 of the upstream surface 275. Naturally the fold edges of the downstream surface likewise extend perpendicular to the support elements 290.

Figure 10A:
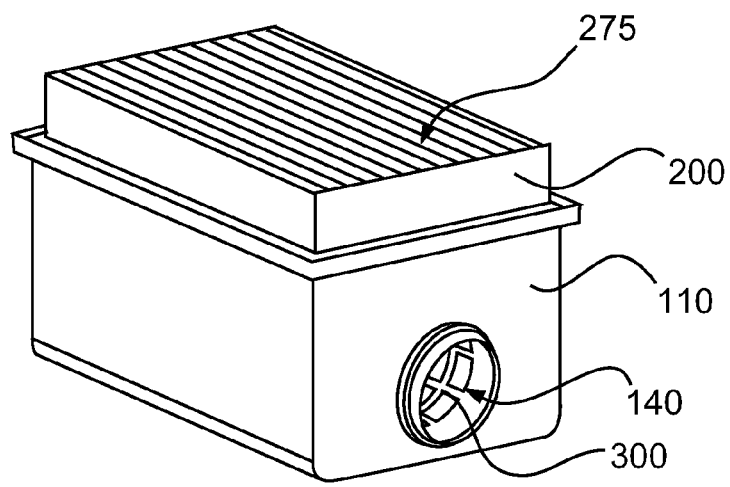
FIG. 10A is an isometric depiction of an air filter according to an exemplary embodiment of the invention.

Analogous to FIG. 10, FIG. 10A is an isometric view of the housing body with the inserted air filter element 200 from FIGS. 8A, 9A, and 9B. It is clear that the outflow opening 140 is situated on a wall of the housing body 110 that extends perpendicular to the shape of the filter folds on the upstream surface 275 and extends in a corresponding fashion on the downstream surface 285. The volume that is available in the housing body 110 due to the free volume 500 in the air filter element 200 is used so that both the functional component 300 and the main element 200 are situated inside the housing body and in the main element, a maximum filter area of the filter medium is achieved.

Figures 11A, 11B, 11C:
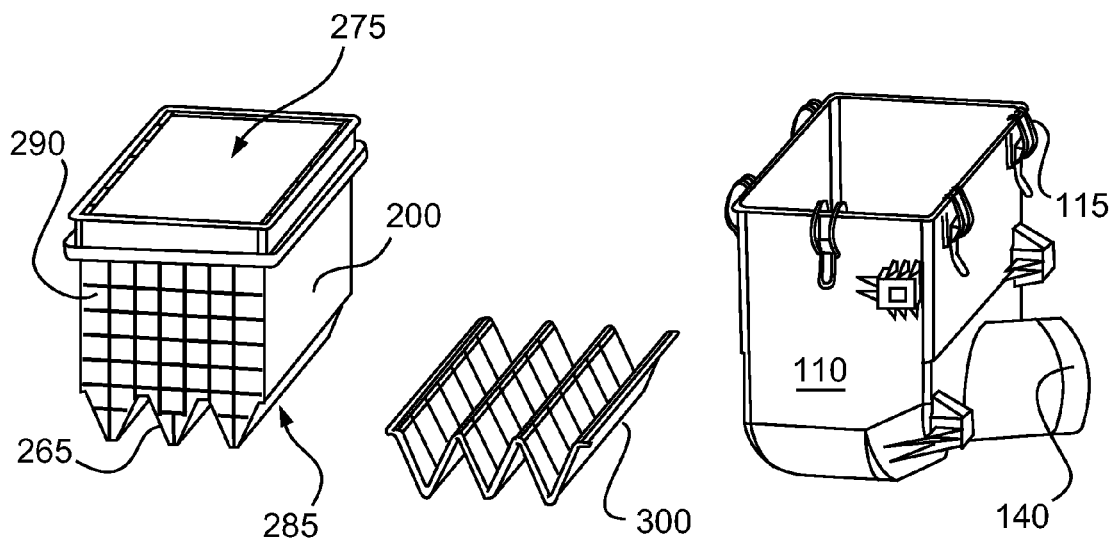
FIG. 11A is an isometric depiction of an air filter element according to an exemplary embodiment of the invention.
FIG. 11B is an isometric depiction of a functional component for an air filter according to an exemplary embodiment of the invention.
FIG. 11C is an isometric depiction of a housing of an air filter according to an exemplary embodiment of the invention.

FIG. 11A shows an isometric view of an air filter element 200; the support element 290 at the downstream surface 285 has a shape corresponding to that of the envelope 265.

FIG. 11B shows a functional component 300, which corresponds to the shape of the envelope 265 of the air filter element 200 from FIG. 11A.

FIG. 11C shows a housing body 110, which is embodied to accommodate the functional component 300 and the air filter element 200 from FIGS. 11B and 11A.

In this case, the housing body 110 has a plurality of locking elements 115 for locking a housing cover to the housing body. The housing body 110 also has an outflow opening and a clean air connection 140.

The sawtooth shape of the surface of the functional component 300 from FIG. 11D and the corresponding shape of the envelope 265 of the downstream surface 285 of the air filter element 200 from FIG. 11A make it possible for the functional component 300 to have an enlarged surface area and therefore an improved filter performance in comparison to a planar or flat functional component and nevertheless, more efficient use is made of the available volume inside the housing body 110.

Figures 12A, 12B:
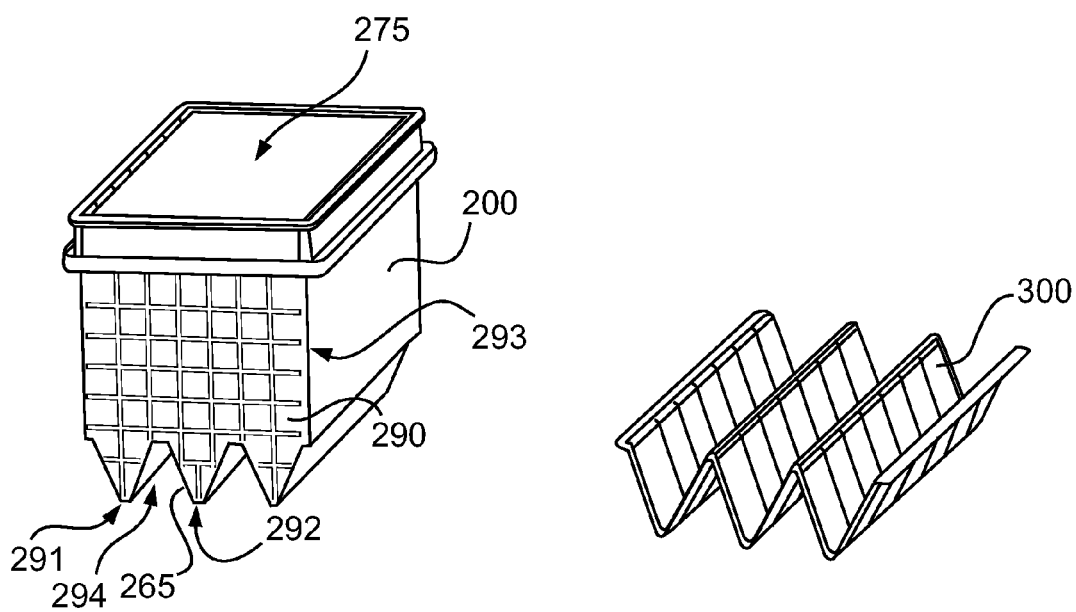
FIG. 12A is an isometric depiction of an air filter element according to an exemplary embodiment of the invention.
FIG. 12B is an isometric depiction of a functional component for an air filter according to an exemplary embodiment of the invention.

FIG. 12A shows an air filter element 200 with a support structure 290.

At the downstream surface 285, the support structure 290 has a shape extending along the envelope 265. In addition, the support structure 290 has a first retaining surface 291 and a second retaining surface 292; the indentation 294 is located or positioned between the first retaining surface 291 and the second retaining surface 292. The indentation 294 essentially corresponds to the shape of the envelope 265 a free volume 500 of the air filter element. The first retaining surface and second retaining surface are embodied to fix the air filter element 200 via the support structure 290 to the housing body of the air filter and/or to position it relative to this housing body.

Because of vibrations of the filter medium of the air filter element 200 during the filtering process, the filter medium should be prevented from coming into contact with the housing body of the air filter since otherwise, the filter medium could be damaged. The first retaining surface 291 and second retaining surface 292 therefore serve to position the air filter element 200, without allowing the filter medium to come into contact with the housing body.

FIG. 12B shows a functional component 300, which corresponds to the shape of the envelope 265 of the air filter element 200 from FIG. 12A.

Figure 13A:
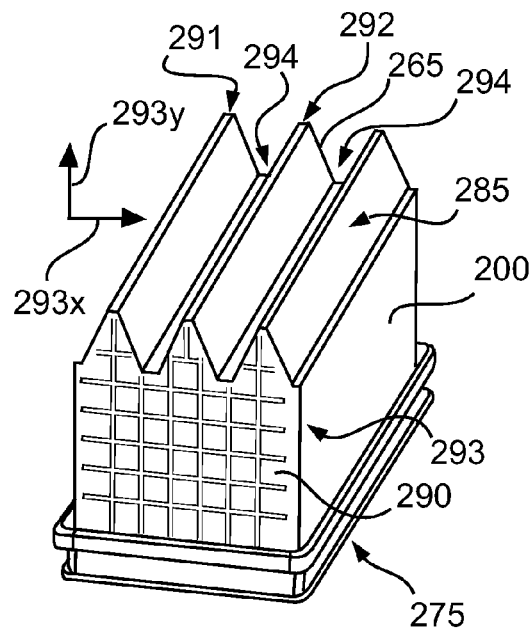
FIG. 13A is an isometric depiction of an air filter element according to an exemplary embodiment of the invention.

FIG. 13A is an isometric depiction of an air filter element 200. The support element 290 in this case extends along a plane 293, which is spanned by the vectors 293$x$ and 293$y$.

As a result, the plane 293 of a support structure 290 extends so that the fold edges of the upstream surface 275 and downstream surface 285 are oriented perpendicular to the plane 293 of the support elements 290 of an air filter element 200.

The envelope 265 of the downstream surface 285 corresponds to a shape of the indentations 294 in the support element 290. Like the first retaining surface 291 and second retaining surface 292, the indentations 294 serve to fix and position the air filter element inside the housing body.

Figure 13B:
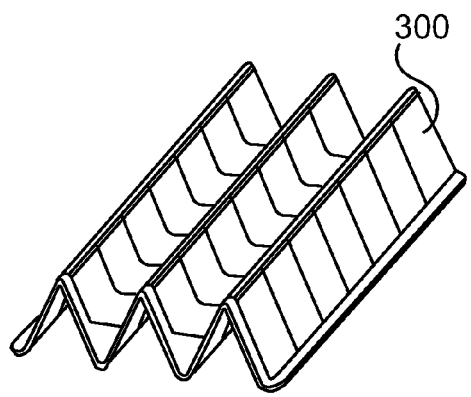
FIG. 13B is an isometric depiction of a functional component for an air filter according to an exemplary embodiment of the invention.

FIG. 13B shows a functional component 300, which corresponds to the shape of the envelope 265 of the downstream surface 285 of the air filter element 200 from FIG. 13A.

Figure 13C:
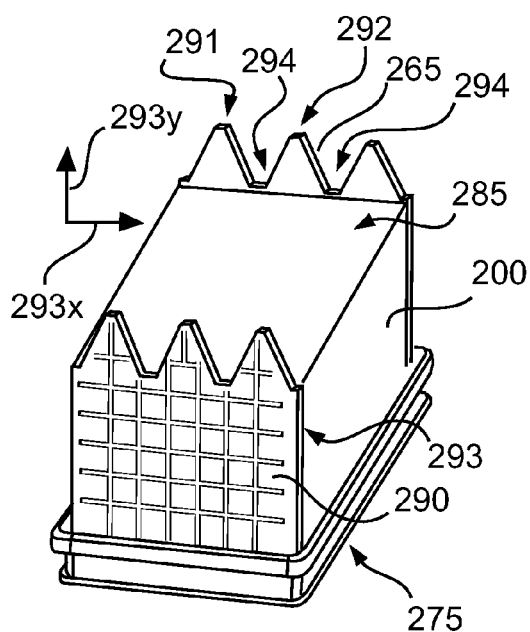
FIG. 13C is an isometric depiction of an air filter element according to an exemplary embodiment of the invention.

FIG. 13C shows an air filter element 200 in which the downstream surface 285 extends in planar fashion between the support elements 290. The filter edges of the air filter element extend as part of a plane on the downstream surface 285; this means that the fold depths of all folds of the air filter element are the same.

The fold depths and the positions of the fold edges at the downstream surface 285 and the downstream surface 285 itself are, in and of themselves, arranged so that the downstream surface 285, together with all of the fold edges associated with it, is recessed from the first retaining surface 291, the second retaining surface 292, and the indentations 294 in a direction toward the upstream surface 275. This means that starting from the downstream surface 285, the retaining surfaces 291, 292 and the indentations 294 extend in the flow direction pointing away from the downstream surface. As a result, the retaining surface 291, 292 can protrude deeper into a housing body of an air filter than the filter medium or the fold edges of the downstream surface 285 do.

The downstream surface 285 can be embodied so that the fold edges of the filter medium that are situated on it are situated at exactly the same height as the indentations 294.

Figure 13D:
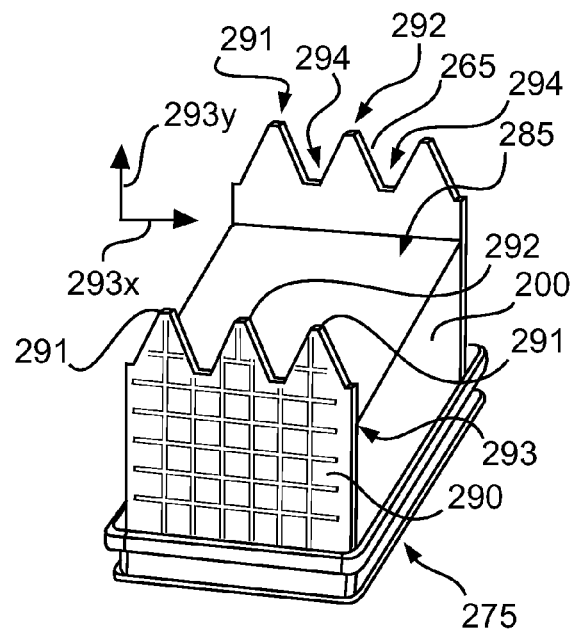
FIG. 13D is an isometric depiction of an air filter element according to an exemplary embodiment of the invention.

FIG. 13D shows an air filter element 200 analogous to the air filter element 200 in FIG. 13C; in FIG. 13D, the downstream surface 285 is not situated at the height of the indentations 294, but instead is spaced a certain distance apart from the indentation.

As a result, when inserted into a housing body, not only do the retaining surfaces 291, 292 protrude from the air filter element 200 deeper into the housing body than the downstream surface 285, but some of the support elements 290 do so as well.

The FIGS. 13C and 13D also show a design of an air filter element in which the downstream surface 285 is closer to the upstream surface 275 than the retaining surfaces 291, 292 and indentations 294 and in which the upstream surface 285 is situated between the upstream surface 275 and the retaining surfaces 291, 292 and indentations 294 in a flow direction of the air through the air filter element 200.

It should be noted that the distance of the downstream surface 285 from the retaining surfaces 291, 292 and indentations 294 of the support elements can be variably embodied and, for example, can be adapted to the circumstances and structural requirements inside the housing body.

Figure 14:
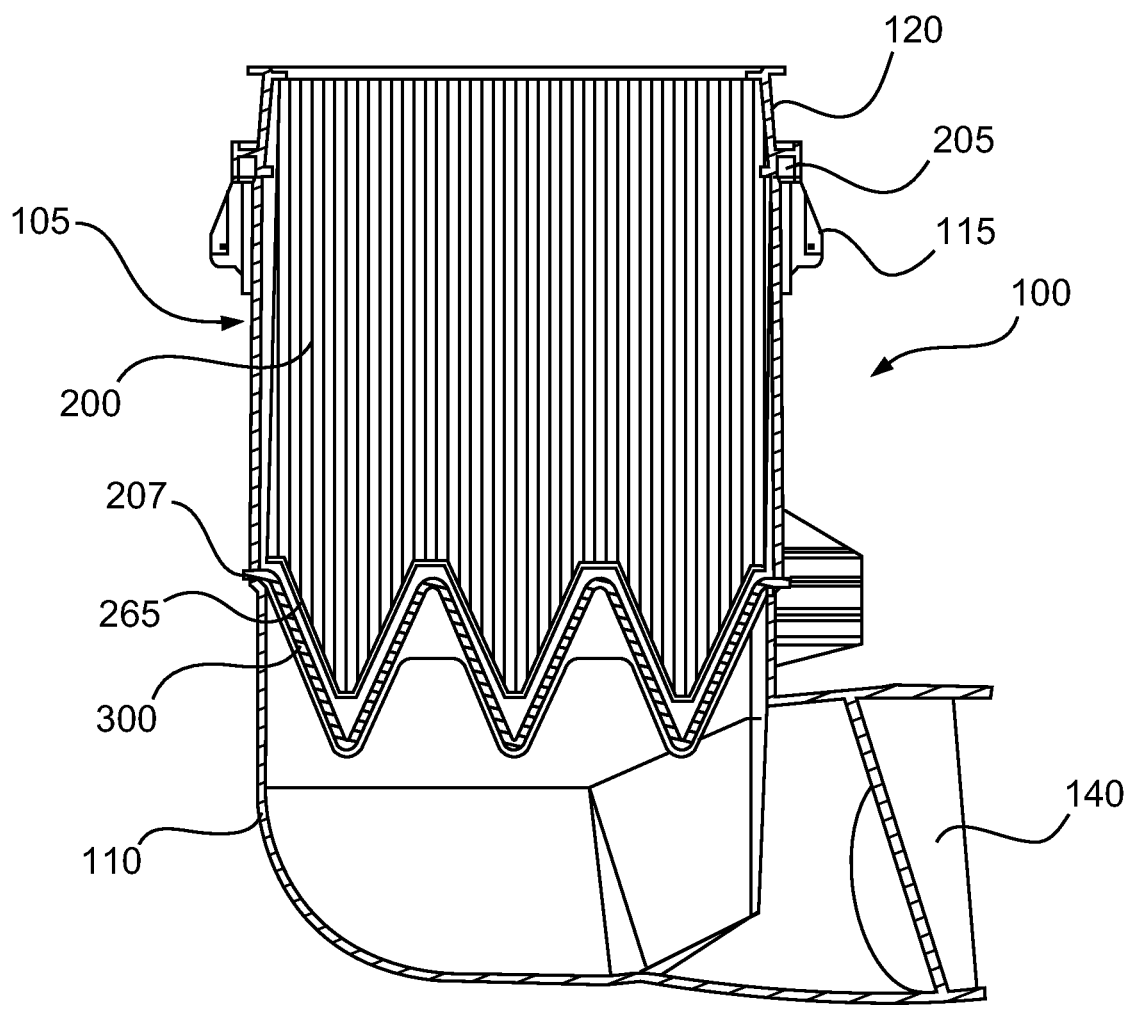
FIG. 14 shows a sectional view of an air filter with a main element, a functional component, and a housing according to an exemplary embodiment of the invention.

FIG. 14 shows a sectional view of an air filter 100. The housing 105 is composed of the housing cover 120 and the housing body 110; the housing body and the housing cover are affixed to each other and locked by means of locking elements 115 and a seal 205 seals the housing between the housing body and housing cover.

Inside the housing body is the main element 200 or air filter element 200 whose downstream surface has the shape of the envelope 265 and corresponds to the form of the functional component 300. The functional component 300 is connected to the housing body 110 by means of the filter collar 207.

The air that has flowed through the air filter element 200 and the functional component 300 exits the air filter 100 through the outflow opening 140.

Figure 15:
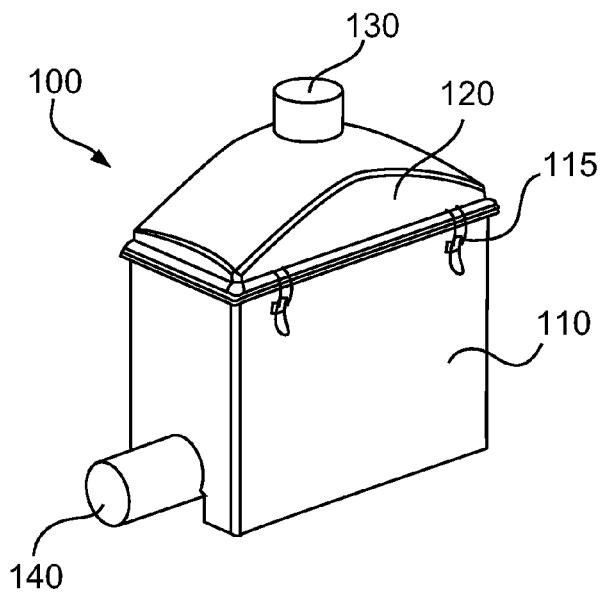
FIG. 15 is an isometric depiction of an air filter according to an exemplary embodiment of the invention.

FIG. 15 is an isometric depiction of an air filter 100 in which the air filter has a housing body 110, a housing cover 120, and locking elements 115 for locking the housing body to the housing cover. The housing cover 120 is provided with a first inflow opening 130 and the housing body 110 is provided with an outflow opening 140. The dirty air flows through the inflow opening 130 into the air filter or housing, is filtered in the air filter, and exits the air filter through the outflow opening or clean air connection 140.

Figure 16:
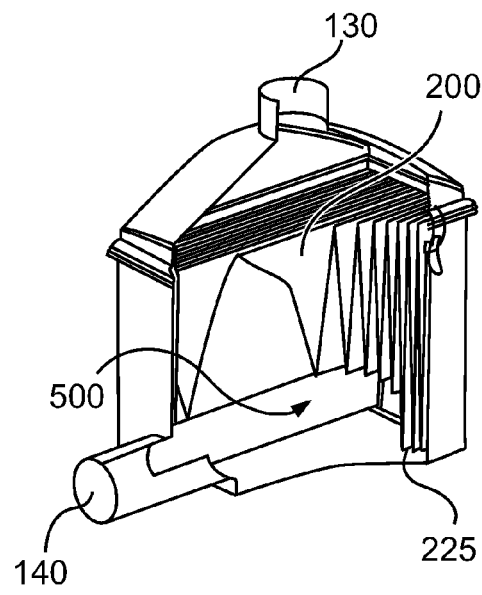
FIG. 16 shows a sectional view of an isometric depiction of an air filter according to an exemplary embodiment of the invention.

FIG. 16 shows a sectional view of an isometric depiction of the air filter 100 from FIG. 15. The air filter element 200 is situated inside the housing body 110; the air that is to be filtered passes through the air filter element 200 from the direction of the inflow opening 130 and exits the housing body through the outflow opening or clean air connection 140.

In the region of the outflow opening 140, the air filter element 200 has a free volume 500. In the region of the free volume 500, the fold edges 225 on the downstream surface 285 of the air filter element 200 form an envelope and consequently a free volume of the air filter element; the profile of the air filter element or the shape of the envelope on the downstream surface is adapted to the position and outflow direction of the clean air connection 140 so that there are no abutting edges and there is no sharp deflection of the air flow exiting the air filter element 200 at the downstream surface. Through reciprocal matching of the position of the outflow opening 140 and the geometry of the air filter element 200, i.e. the shape and size of the free volume 500, it is possible to optimize the air flow through the air filter and inside the housing of the air filter and to reduce a pressure loss in the air flowing through the air filter.

The free volume 500 therefore permits the air flow to first exit the air filter element 200 at the downstream surface and then to flow in the direction of the outflow opening 140; the free volume 500 can be adapted to the position and size of the outflow opening 140. In this case, the air filter element 200 with folds of variable fold depths can counteract a loss of filter area since the free volume 500 is only adapted to the size of the outflow opening 140 and a reduction of the fold depth is not present in all filter folds.

Figure 17:
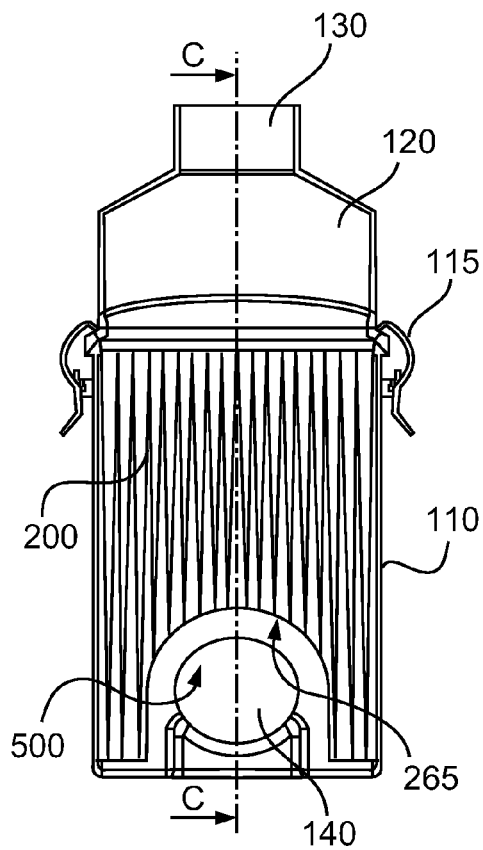
FIG. 17 shows a sectional view of an air filter according to an exemplary embodiment of the invention.

FIG. 17 shows a sectional view of the air filter from FIG. 16. As is clearly evident, the outflow opening 140 has a circular shape and the envelope 265 extends so that the free volume 500 is adapted to shape and geometry of the outflow opening 140. This ensures that the air flowing through the air filter element 200 has exited the filter folds on the downstream surface before the air flow is deflected in the direction of the outflow opening 140. In particular, an improved deflection of the air flow occurring at the downstream surface of the air filter element 200 can be achieved by the fact that the support structure also extends along the envelope 265. The free volume 500 thus constitutes a chamber or cavity inside the housing body 110, in which the air flow, which travels perpendicular to the fold edges 225 at the downstream surface 285 when exiting the air filter element 200 is deflected so that the air flow travels parallel to the shape of the fold edges 225 at the downstream surface 285 since the outflow opening 140 requires a shape of the air flow that is parallel to the fold edges.

Figure 18:
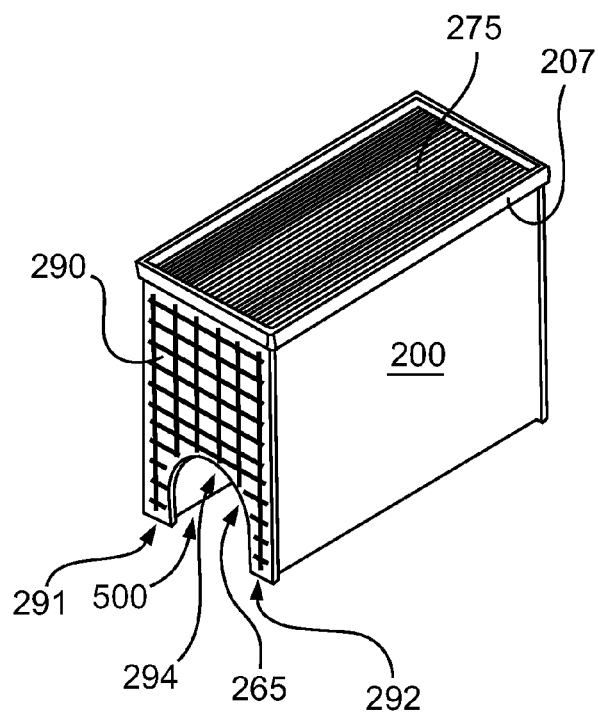
FIG. 18 is an isometric depiction of an air filter element according to an exemplary embodiment of the invention.

FIG. 18 shows an isometric view of an air filter element 200 with a semicircular free volume 500. The air filter element 200 from FIG. 18 corresponds to the embodiment of the air filter element 200 in FIGS. 15 through 17.

The support structure 290 has a first retaining surface 291 and a second retaining surface 292; an indentation 294 is situated between the retaining surfaces 291, 292 and this indentation 294 corresponds to the shape of the envelope 265 or correlates to the shape of the envelope 265.

Figure 19:
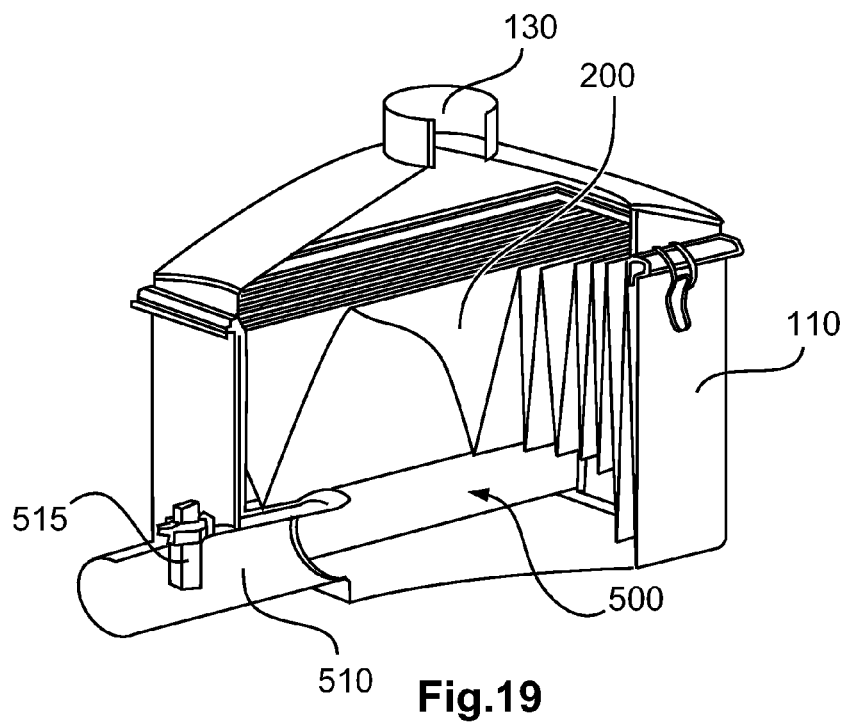
FIG. 19 shows a sectional view of an isometric depiction of an air filter according to an exemplary embodiment of the invention.

FIG. 19 shows an air filter with a housing body 110 in which a flow straightener 510 protrudes through a wall of the housing body into the interior of the air filter and housing body.

The flow straightener 510 can, for example, be a so-called inflow tulip, which protrudes into the housing so that the outflowing air is calmed before it passes a mass air flow meter 515, i.e. a uniform air flow is achieved without the mass air flow meter having to be spaced a great distance apart from the housing wall.

To ensure reliable measurement results of the mass air flow meter 515, it is important for the air flowing past the mass air flow meter to be free of turbulence and free of irregular air flows or air flow paths. For this reason, if a mass air flow meter is provided, the air flowing past must be flowing in a uniform fashion. This can be achieved, for example, by using a flow straightener in the form of a tube; the air flowing through this tube flows essentially in one flow direction so that the flowing air flows through this tube without turbulence. In addition, turbulence can be reduced by a grid 511 (only indicated schematically in FIG. 19) mounted in the tube.

If the filtered air exits the air filter element 200 at the downstream surface, then this air in the filter in FIG. 19 must first be deflected since the outflow opening 140 is oriented orthogonal to the outflow direction of the air. This deflection of the air flow causes turbulence, which means that the mass air flow meter 515 cannot be mounted directly at the outflow opening or in its immediate vicinity or in the clean air connection 140 where the air flows into the outflow opening.

Because the flow straightener or inflow tulip 510 protrudes into the housing and housing body 110, the mass air flow meter can be mounted in the vicinity of the housing wall of the housing body 110 and it is nevertheless possible to provide a flow-free flow in the vicinity of the mass air flow meter.

The free volume 500 of the air filter element 200 can be adapted in accordance with the geometric form of the flow straightener 510. As a result, the envelope 265 of the fold edges at the downstream surface of the air filter element 200 is adapted to a cross-section of the flow straightener 510.

In other words, the inflow tulip can also be situated centrally in a wall of the housing body and is surrounded by the air filter element in a ring or half-ring, which makes it possible to select a maximum size for the filter area of the air filter element and as a result, the inflow tulip protruding into the housing body does not cause any significant loss in filter area. Not all of the fold depths of the filter folds are adapted to the installation position of the flow straightener; the only filter folds with a lower fold depth are those that coincide with the cross-sectional area of the flow straightener.

For example, the mass air flow meter 515 can be a hot film mass air flow meter. In this case, a mass air flow measurement takes place through a change in the electrical resistance in a metal film; air flows past this metal film and causes it to cool, which changes the resistance of the metal film, thus making it possible to measure the air mass flow rate.

Figures 20, 21:
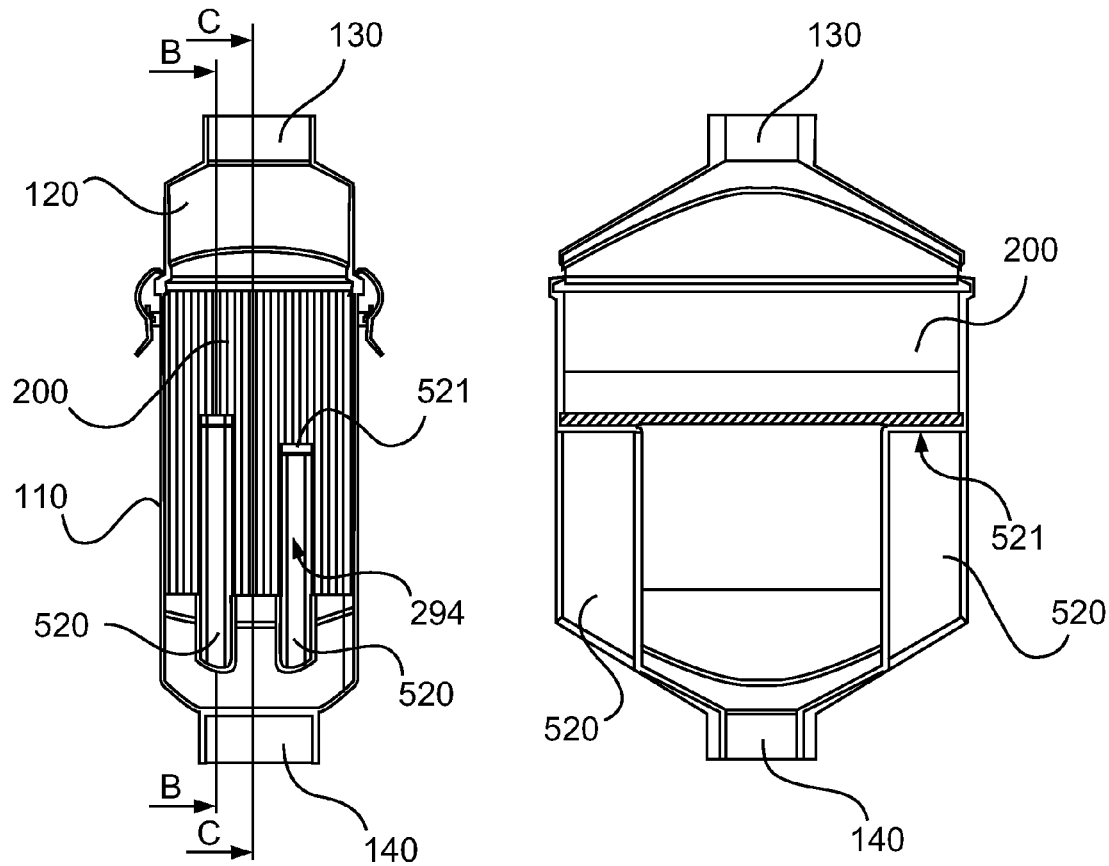
FIG. 20 shows a sectional view of an air filter according to an exemplary embodiment of the invention.
FIG. 21 shows a sectional view of an air filter according to an exemplary embodiment of the invention.

FIG. 20 shows a side view of a housing body 110 with a housing cover 120; an air filter element 200 is situated in the housing body.

The housing body 110 has two housing ribs 520 or housing support ribs 520, each with a respective retaining surface 521. The housing ribs 520 extend in a longitudinal direction between the upstream surface and downstream surface of the air filter element 200. In this case, the housing ribs 520 protrude into the housing body 110 in the direction of the shape of the fold edges of the filter folds, i.e. perpendicular to the upstream surface and downstream surface and in the direction of the support element 290 of the air filter element 200.

The housing support ribs 520 serve to reinforce the dimensional stability of the housing body 110. The housing ribs 520 can penetrate a variable depth into the housing body and can even extend through the housing body in the direction of the fold edges.

The housing ribs 520 have a retaining surface 521; this retaining surface is embodied to accommodate an indentation 294 of the support element 290 of the air filter element 200 and thus to position and fix the air filter element 200 inside the housing body 110. Placing the indentation 294 against the retaining surface 521 ensures that the filter folds do not come into contact with the housing support ribs; instead, the housing support ribs 520 are contacted only by the support structure 290.

FIG. 21 shows a sectional depiction along the section line B-B from FIG. 20. The housing ribs 520 each protrude laterally into the housing body 110 and air filter element 200. As illustrated above, the penetration depths of the housing ribs 520 are of variable dimensions and can also, for example, be embodied as continuous from one housing wall to another housing wall.

Figure 22:
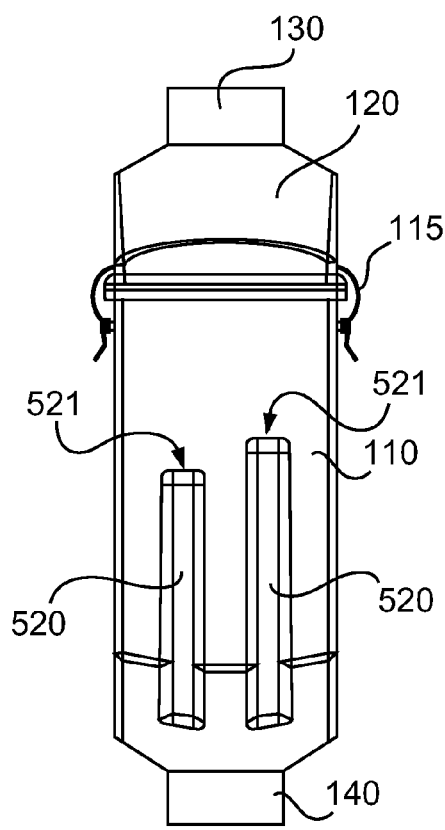
FIG. 22 shows a side view of an air filter according to an exemplary embodiment of the invention.

FIG. 22 shows a side view of a housing body 110 with a housing cover 120. The housing body 110 has two the housing support ribs 520; a first housing support rib 520 has a first retaining surface 521 and a second housing support rib 520 has a second retaining surface 521.

The housing support ribs 520 can have different heights, i.e. spans in the longitudinal direction between the upstream surface and downstream surface of the inserted air filter element, and entirely different geometric dimensions, e.g. widths.

Figure 23:
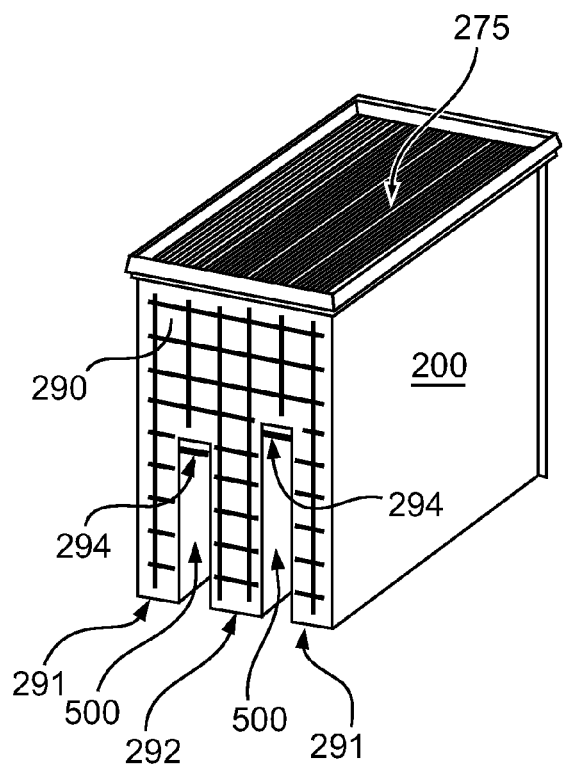
FIG. 23 is an isometric depiction of an air filter element according to an exemplary embodiment of the invention.

FIG. 23 shows an isometric view of an air filter element 200 that matches the housing body 110 from FIG. 22.

The air filter element 200 has two free volumes 500; a first free volume 500 and first indentation 294 are formed by a first retaining surface 291 and second retaining surface 292, respectively, while a second free volume 500 and second indentation 294 are formed by the second retaining surface 292 and another retaining surface 291, respectively.

Figure 24:
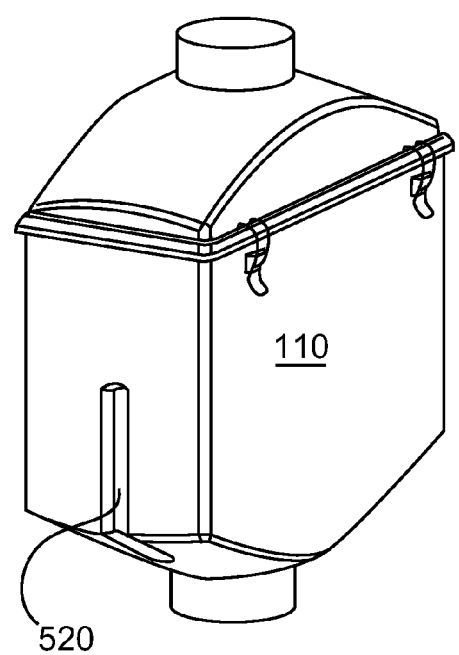
FIG. 24 is an isometric depiction of an air filter according to an exemplary embodiment of the invention.

FIG. 24 is an isometric depiction of an air filter with a housing body 110; the housing body 110 has a single housing support rib 520.

The explanations given for FIGS. 20 through 23 apply analogously to the embodiment of the air filter shown in FIG. 24, with the difference that FIG. 24 shows only a single housing support rib 520.

Naturally, as described above and below, a housing body 110 can also have a plurality of housing support ribs 520, in particular more housing support ribs than are shown here in the drawings, i.e. it can, for example, have three or more housing support ribs.

Figure 25:
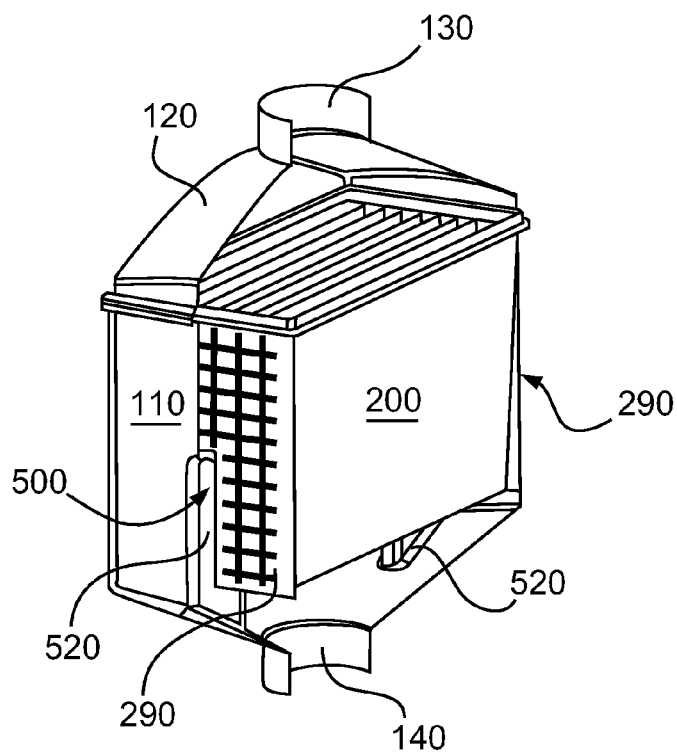
FIG. 25 shows a sectional view of an isometric depiction of an air filter according to an exemplary embodiment of the invention.

FIG. 25 shows a sectional view of an isometric depiction of the air filter from FIG. 24.

FIG. 25 shows how the housing support ribs 520 engage in the air filter element 200 and, via the support structure 290, fix the air filter element 200 in the housing body 110. In this case, the housing support ribs 520 engage in the free volume 500 of the support structure 290 or air filter element 200 from two sides.

Figure 26:
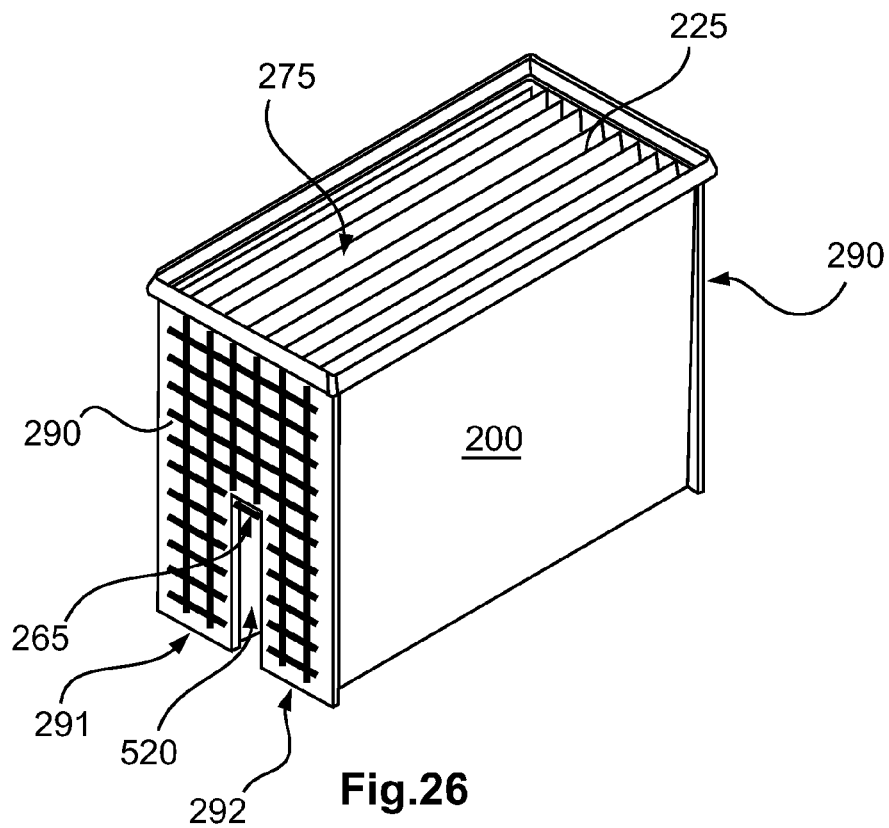
FIG. 26 is an isometric depiction of an air filter element according to an exemplary embodiment of the invention.

FIG. 26 is an isometric depiction of an air filter element 200 that is analogous to the depiction in FIG. 25.

The air filter element 200 has two support elements 290, which are situated perpendicular to a shape of the fold edges 225 on the upstream surface 275 and downstream surface 285.

At the support elements 290 and the air filter element 200, the envelope 265 forms an indentation 294 or a correlating free volume 500 for the housing support ribs 520; the indentation 294 is formed by the first retaining surface 291 and second retaining surface 292.

Figure 27:
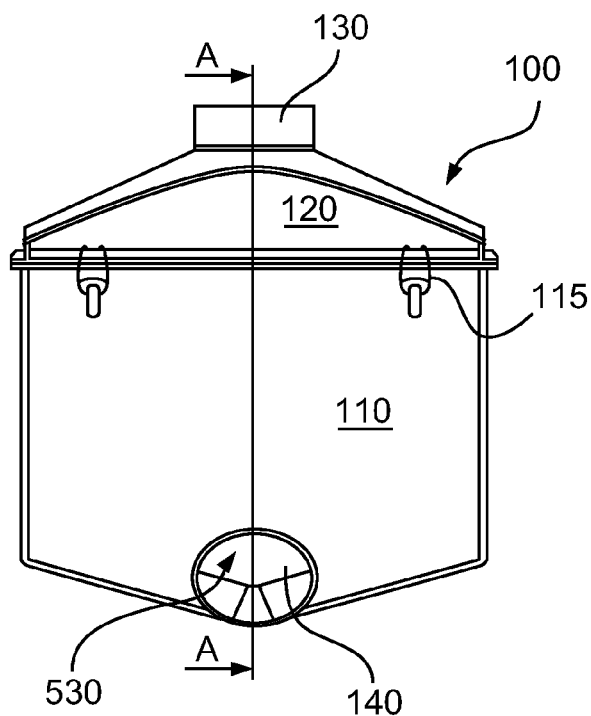
FIG. 27 shows a front view of an air filter according to an exemplary embodiment of the invention.

FIG. 27 shows an air filter 100 with a housing body 110 and a housing cover 120, which are attached to each other by means of locking elements 115. Inside the housing body 110, in front of the outflow opening 140, a resonator 520 or cavity resonator geometry 530 is provided, which is embodied to reduce the flow noise of the air flowing through the housing.

Figure 28:
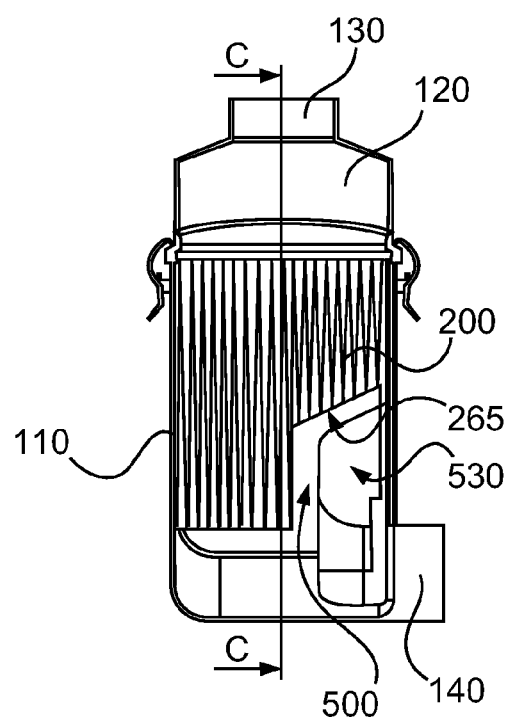
FIG. 28 shows a sectional view of an air filter according to an exemplary embodiment of the invention.

FIG. 28 shows a sectional view of an air filter along the section line A-A from FIG. 27.

The resonator 530 is situated inside the housing body 110, in the free volume 500 extending along the envelope 265 at the downstream surface of the air filter element 200.

An air filter element with filter folds of variable fold depths makes it possible to mount a resonator inside the housing body and to maximize the filter area of the filter medium of the air filter element at the same time. The resonator 530 is therefore situated directly at the outflow opening 140 or directly in front of the connection to an external clean air line. This makes it unnecessary to subsequently attach the resonator to the clean air line or the dirty air line outside the housing and at the same time, reduces the available filter area of the air filter element 200 to only a minimal degree since the free volume 500 is adapted to the dimensions of the resonator 530.

Figure 29:
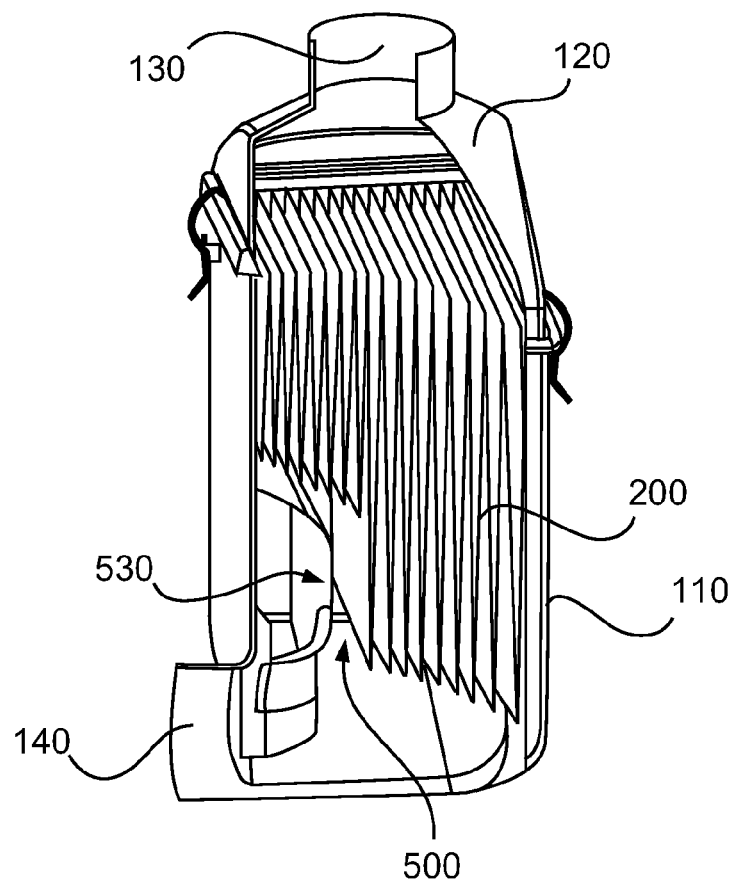
FIG. 29 shows a sectional view of an isometric depiction of an air filter according to an exemplary embodiment of the invention.

FIG. 29 shows a sectional view of an isometric depiction of an air filter with a housing body 110 and a housing cover 120; a resonator 530 and an air filter element 200 are situated inside the housing body 110. In this case, the air filter element 200 has a free volume 500; the free volume 500 is adapted to the spatial dimensions of the resonator geometry 530. In addition, i.e. in a region of the housing body that is not occupied by the resonator geometry 530, the filter folds of the air filter element 200 have an unreduced filter fold depth, so that the filter area of the filter medium is only minimally reduced by the mounting of the resonator 530 inside the housing body 110.

Figure 30:
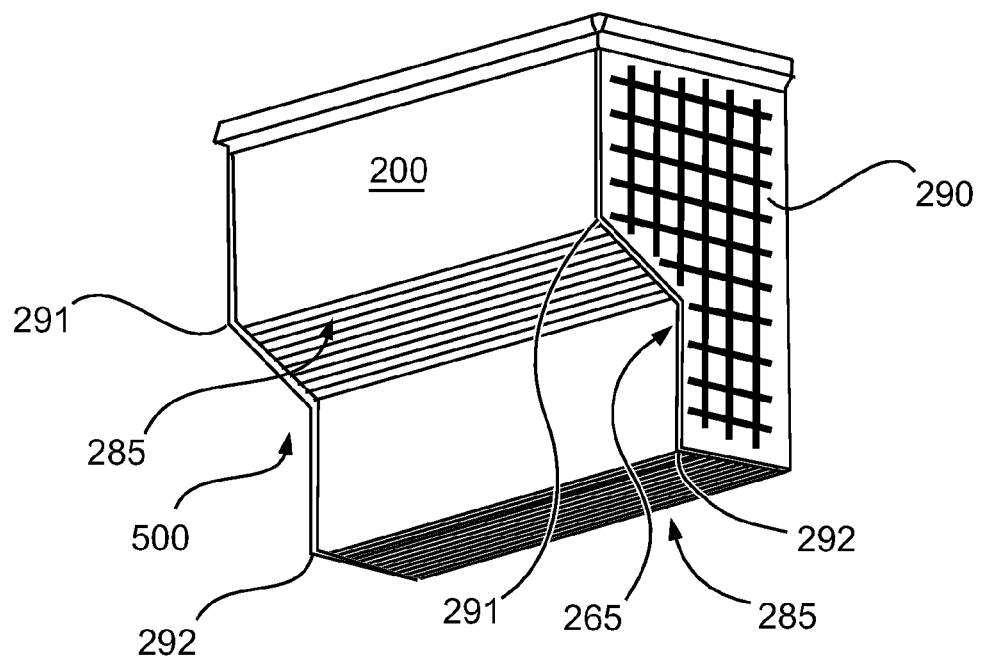
FIG. 30 is an isometric depiction of an air filter element according to an exemplary embodiment of the invention.

FIG. 30 is an isometric depiction of an air filter element 200 from FIGS. 27 through 29. As is clearly evident, the downstream surface 285 and the support elements 290 of the air filter element have a free volume 500 in accordance with the shape of the envelope 265; the free volume 500 is embodied to accommodate a resonator.

In addition, the support elements 290 have a respective first retaining surface 291 and second retaining surface 292 situated on them; an indentation of the support element 290 correlating to the free volume 500 is situated or formed between the retaining surfaces 291, 292.

Figure 31:
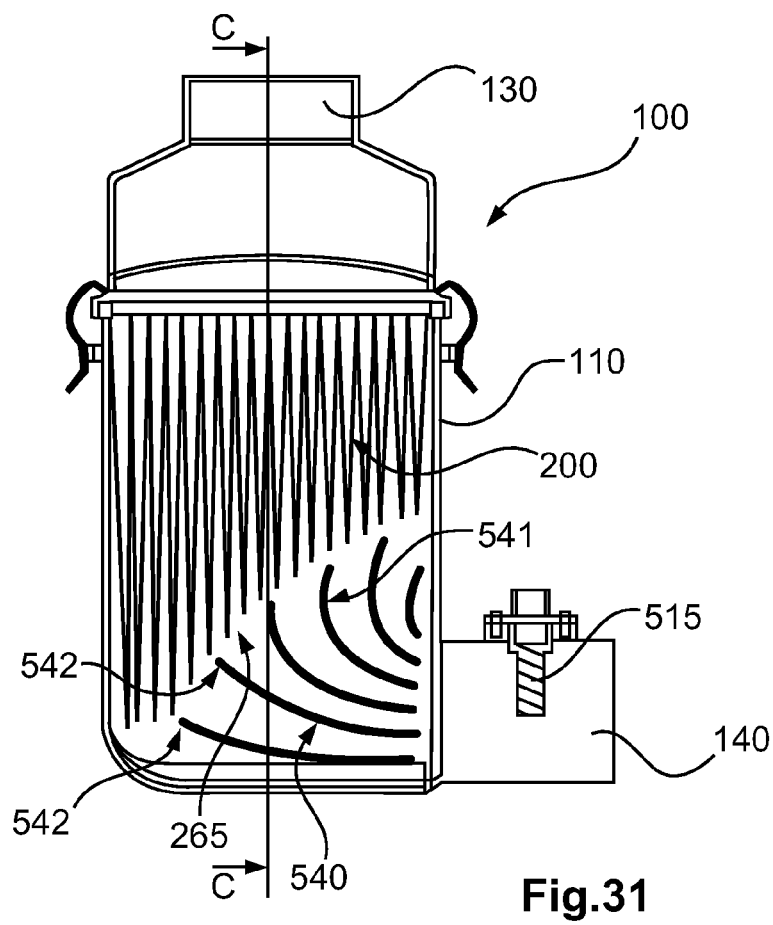
FIG. 31 shows a sectional view of an air filter according to an exemplary embodiment of the invention.

FIG. 31 shows an air filter 100; an air filter element 200 and a baffle device 540 or baffle ribs 540 are situated in the housing body 110.

The baffle device 540 has a plurality of baffle ribs; each baffle rib has a baffle surface 541 and a baffle surface edge 542.

The individual baffle ribs of the baffle device 540 are arranged so that they cover a projected area of the downstream surface 285 of the air filter element in order to thus prevent or reduce turbulence or irregularities in the air flow downstream of the downstream surface. As a result, attaching a baffle device 540 makes it possible to reduce the distance of a mass air flow meter 515 from the housing body 110 in the outflow opening 140.

The baffle surface edges 542 of the individual baffle ribs combined to form an envelope, which corresponds to the envelope 265 of the downstream surface 285 of the air filter element 200. This makes it possible for the volume inside the housing body to be optimally parceled out to the air filter element 200 and the baffle device 540 since the fold depth of the filter folds is adapted to the shape of the baffle surface edges 542 of the individual baffle ribs of the baffle device 540.

As opposed to variable filter fold depths, with an air filter element that has a constant filter fold depth, the depth of the filter folds would have to be oriented on that of the filter fold with the smallest filter fold depth. This would result in a significant loss of filter area.

Figure 32:
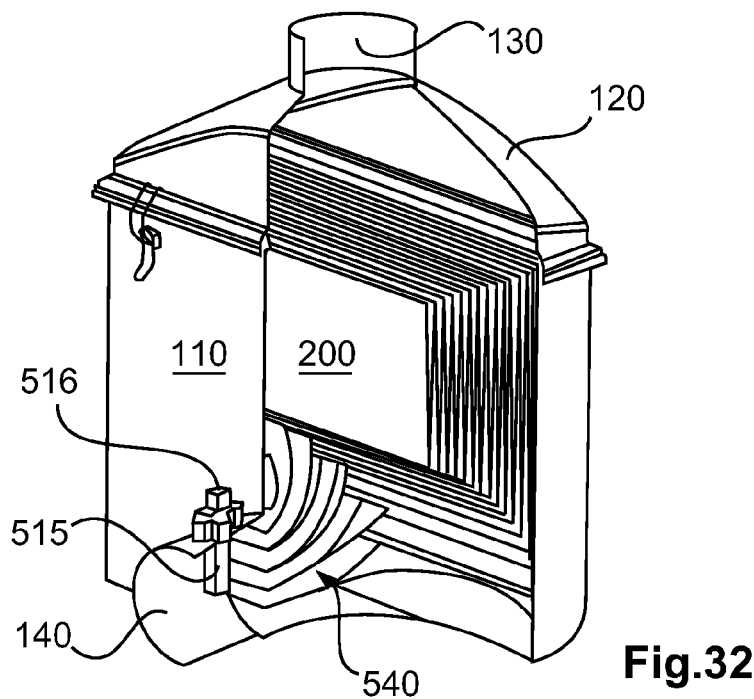
FIG. 32 shows a sectional view of an isometric depiction of an air filter according to an exemplary embodiment of the invention.

FIG. 32 shows a sectional view of an isometric depiction of an air filter whose housing body 110 contains an air filter element 200 and a baffle device 540. The drawing clearly shows the adaptation of the downstream surface of the air filter element 200 to the shape of the baffle surfaces and to the shape of the baffle surface edges of the individual baffle ribs of the baffle device.

Figure 33:
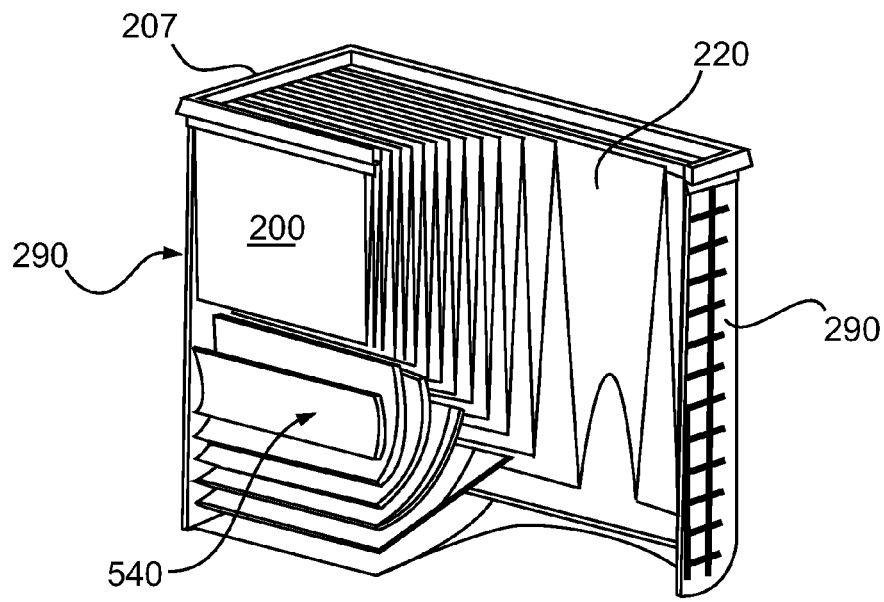
FIG. 33 shows a sectional view of an isometric depiction of an air filter element according to an exemplary embodiment of the invention.

FIG. 33 shows a sectional view of an isometric depiction of an air filter element 200 with a baffle device 540.

In this case, the individual baffle ribs of the baffle device 540 are attached to the support element 290.

The deflecting function for the air flow of the baffle device 540 is shown with particular clarity in FIG. 33. The air flow exits the downstream surface of the air filter element 200 essentially in the direction of the shape of a filter fold 220 and is deflected by the baffle ribs of the baffle device 540 in a direction orthogonal to the shape of the filter fold 220.

The deflecting direction of the air flow by the baffle ribs can naturally be oriented at any angle and is adapted to the position of the outflow opening 140 on the housing of the air filter.

It should be noted that the baffle ribs of the baffle device 540 can be situated on the support elements 290 of an air filter element 200; the baffle ribs of the baffle device 540 can also be situated on the housing body 110 of an air filter.

If the baffle device 540 is fastened to the housing body of an air filter, then the air filter element can be replaced without having to replace the baffle device 540 along with it. It may not be absolutely necessary, for example, to replace the baffle device along with an air filter element since the baffle device is not subject to the same amount of soiling as the air filter element whose primary task is to filter dirt particles out of the dirty air and is thus naturally subject to a greater level of soiling and wear.

Figure 34:
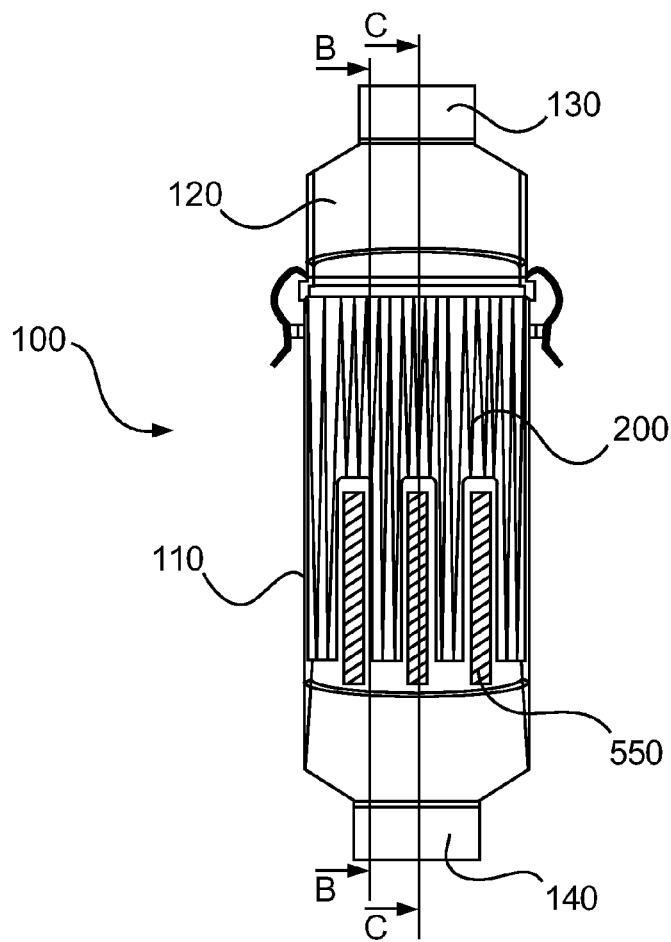
FIG. 34 shows a side view of an air filter according to an exemplary embodiment of the invention.

FIG. 34 shows a side view of an air filter 100; the housing body 110 contains an air filter element 200 and three adsorption filter elements for hydrocarbons 550—in particular for highly volatile hydrocarbons—that contain an activated charcoal material, for example.

The adsorption filter elements for hydrocarbons 550 can, for example, be a hydrocarbon adsorption unit. The adsorption filter elements for hydrocarbons 550 in this case are situated between the downstream surface of the air filter element 200 one the one hand and the clean air connection 140 on the other. Free volumes in the air filter element make it possible for the adsorption filter elements for hydrocarbons, together with the air filter element 200, to be situated in the housing body 110, thus only reducing the filter area of the filter medium of the air filter element 200 to an insignificant degree.

In particular, the adsorption filter elements for hydrocarbons 550 can be affixed to the housing body 110, i.e. in such a way that they are able to withstand mechanical stress.

Figure 35:
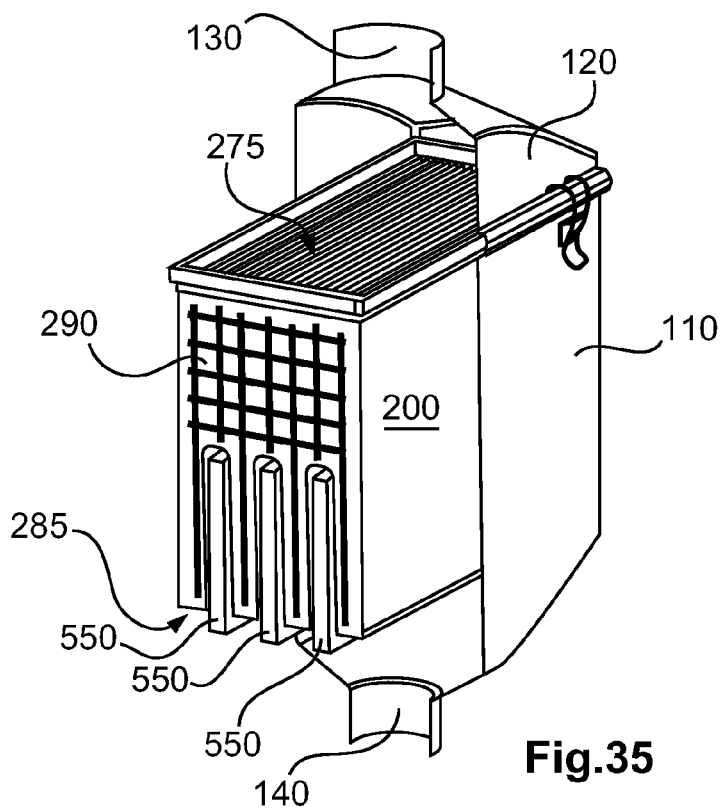
FIG. 35 shows a sectional view of an isometric depiction of an air filter according to an exemplary embodiment of the invention.

FIG. 35 shows a sectional view of an isometric depiction of an air filter; the housing body 110 has an air filter element 200 and three adsorption filter elements for hydrocarbons 550. The adsorption filter elements for hydrocarbons 550 protrude into the downstream surface 285 of the air filter element 200 and into the support element 290.

Figure 36:
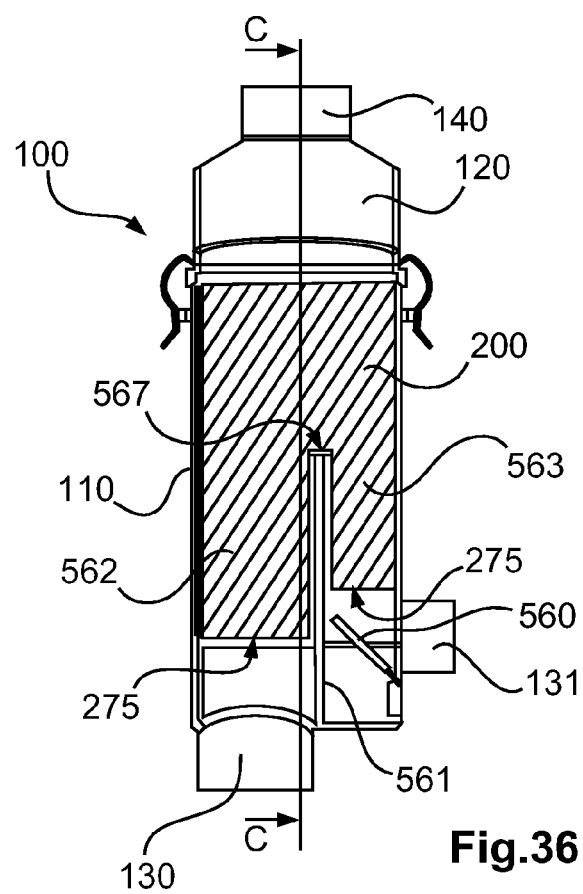
FIG. 36 shows a side view of an air filter according to an exemplary embodiment of the invention.

FIG. 36 shows an air filter 100 with a housing body 110 and a housing cover 120. The housing body 110 has a first inflow opening 130 and a second inflow opening 131. The housing cover 120 has the outflow opening 140. The air filter element 200 has a partitioned upstream surface 275; the upstream surface 275 is partitioned by a housing partition wall 561 of the housing body and forms a first dirty air chamber 562 and second dirty air chamber 563. The housing partition wall 561 has a sealing surface 567 so that the first dirty air chamber 562 is sealed off from the second dirty air chamber 563.

The housing body 110 also has a housing air flow flap 560, which is embodied to basically close the second dirty air connection or second inflow opening 131, i.e. in a first operating state. For example, the housing air flow flap 560 can be kept in the closed position by means of a tension spring. It is naturally possible to provide other closing mechanisms, which open the housing air flow flap when a given vacuum is present in the housing, thus permitting air to flow in.

In the first operating state of the air filter 100, air flows into the air filter via the first inflow opening 130, is filtered via the first dirty air chamber 562, and exits the air filter via the outflow opening 140. If the first dirty air chamber is seriously soiled or clogged, for example because snow has been sucked into the first inflow opening 130, then a vacuum in the air filter housing increases because the outflow opening 140 continues to suck out air from the air filter. Consequently a vacuum, for example, can build up inside the housing, as a result of which the housing air flow flap 560 opens the second inflow opening 131 so that air is sucked into the housing via the second inflow opening 131 and second dirty air chamber 563, in which case the air filter is operated in a second operating state.

FIG. 36 shows that the variable fold depth can also affect the upstream surface 275 of the air filter element 200. As opposed to the exemplary embodiments shown above, in which the downstream surface 285 had a respective free volume, in FIG. 36, the upstream surface 275 has a free volume.

In this connection, it should in particular be noted that both the upstream surface 275 and the downstream surface 285 can have any shape of free volume 500 for elements inside the housing body 110 of the air filter 100, as has also been shown in FIGS. 5F and 5G.

Figure 37:
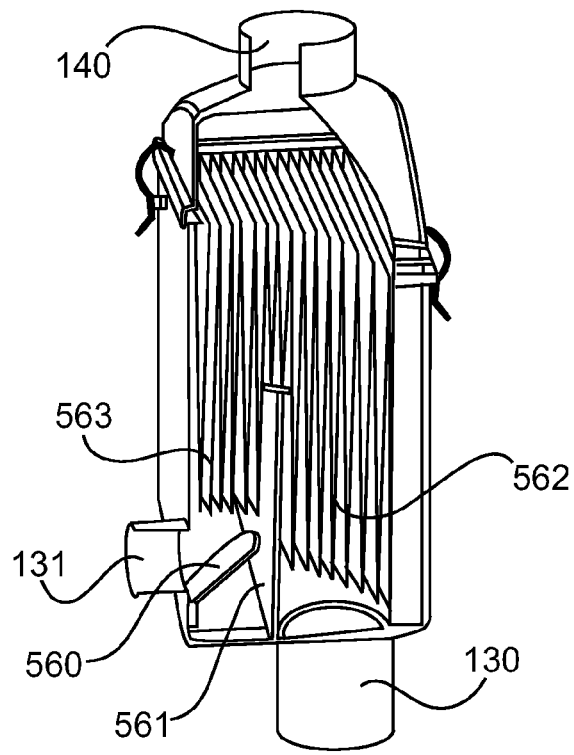
FIG. 37 shows a sectional view of an isometric depiction of an air filter according to an exemplary embodiment of the invention.

FIG. 37 shows a sectional view of an isometric depiction of an air filter with a first dirty air chamber 562 and second dirty air chamber 563, which are respectively supplied with air or dirty air via a first inflow opening 130 and second inflow opening 131; the second inflow opening 131 has a housing air flow flap 560, which is embodied to permit air to flow in via the inflow opening 131 only if the first dirty air chamber 562 becomes clogged. The housing partition wall 561 partitions the first dirty air chamber 562 off from the second dirty air chamber 563.

Figure 38:
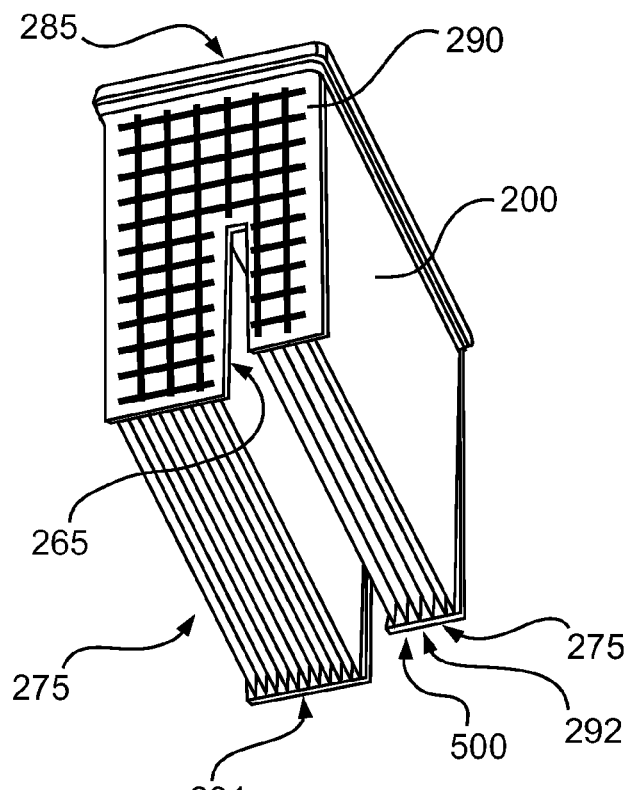
FIG. 38 is an isometric depiction of an air filter element according to an exemplary embodiment of the invention.

FIG. 38 is an isometric depiction of an air filter element 200 from the exemplary embodiments in FIGS. 36 and 37. The upstream surface 275 has two partial surfaces that are stepped relative to each other and are separated by the free volume 500 in the air filter element 200 and support element 290. As a result, the air filter element 200 in FIG. 38 has filter folds with three different filter fold depths: the filter folds in the first part of the upstream surface 275, the filter folds in the vicinity of the free volume 500, and the filter folds in the second region of the upstream surface 275.

Like the downstream end or edge of the support element 290, the upstream end or edge of the support element 290 can naturally also have a first retaining surface 291 and second retaining surface 292.

The retaining surfaces 291, 292 are respectively mounted to the upstream side and downstream side of the air filter element, depending on the insertion direction of the air filter element into the housing body. If the air filter element is inserted into the housing body with the upstream surface in front, then in a preferred exemplary embodiment, the retaining surfaces 291, 292 are situated at the upstream edge of the support element. In another preferred exemplary embodiment, the retaining surfaces 291, 292 are situated at the downstream edge of the support element if the air filter element is inserted into the housing body with the downstream surface of the air filter element in front.

Figure 39:
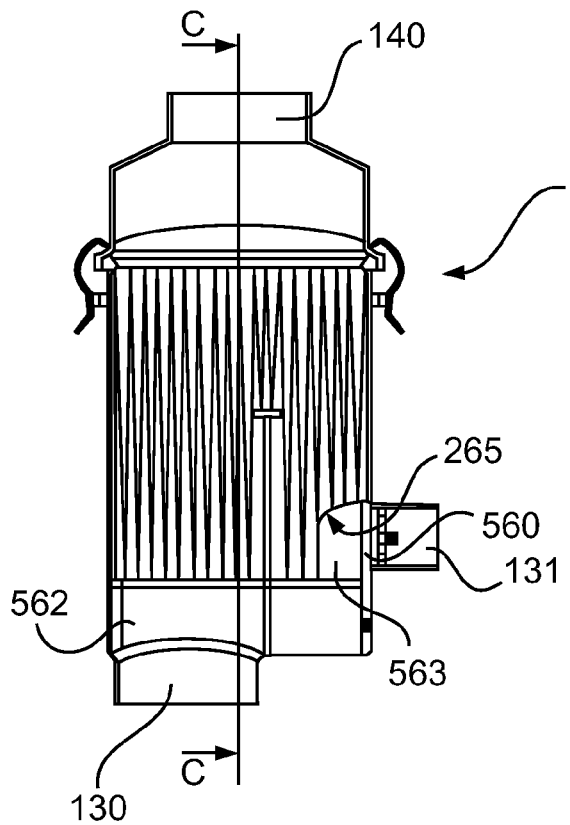
FIG. 39 shows a side view of an air filter according to an exemplary embodiment of the invention.

FIG. 39 shows an air filter 100 analogous to the air filter 100 that was shown in FIG. 36.

FIG. 36 shows the housing air flow flap 560 at the second inflow opening 131 in the open state; FIG. 39 shows the housing air flow flap 560 of the second inflow opening 131 in the closed state. As a result, in the depiction in FIG. 39, air is sucked into the housing of the air filter 100 only via the first inflow opening 130. Conversely, in FIG. 36 air is sucked in via both the first inflow opening 130 and the second inflow opening 131 as long as the first dirty air chamber 562 of the first inflow opening 130 is not completely clogged. If the first dirty air chamber 562 in FIG. 36 is completely clogged, then air is sucked in only via the second inflow opening 131 and the second dirty air chamber 563.

FIG. 36 therefore shows the air filter in the second operating state (i.e. air is being sucked in via the second inflow opening) and FIG. 39 shows the air filter in the first operating state (i.e. air is being sucked in via the first inflow opening).

Also by contrast with FIG. 36, the envelope 265 of the upstream surface 275 of the air filter element does not have a stepped transition to adjacent fold edges, but rather a rounded one. The rounded shape of the envelope 265 can be adapted, for example, to the opening movement of the housing air flow flap 560 and can thus contribute to a further increase of the available filter area of the air filter element.

Figure 40:
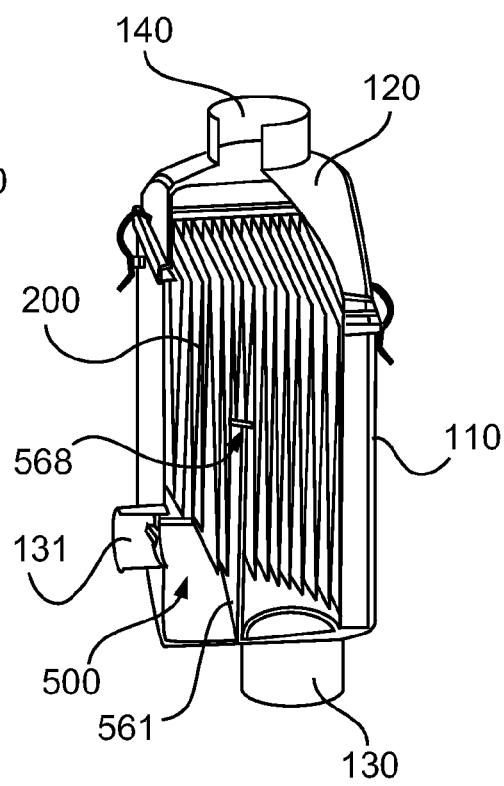
FIG. 40 shows a sectional view of an isometric depiction of an air filter according to an exemplary embodiment of the invention.

FIG. 40 shows a sectional view of an isometric depiction of the air filter shown in FIG. 39.

The housing partition wall 561 has a retaining surface 568; this retaining surface is embodied to accommodate, position, and fix the air filter element 200 in the region of a first retaining surface or second retaining surface 291, 292 of the support element 290. It is also clear from FIG. 40 that the free volume 500 in the region of the upstream surface of the air filter element 200 downstream of the second inflow opening 131 is embodied to permit an opening of the housing air flow flap 560.

Figure 41:
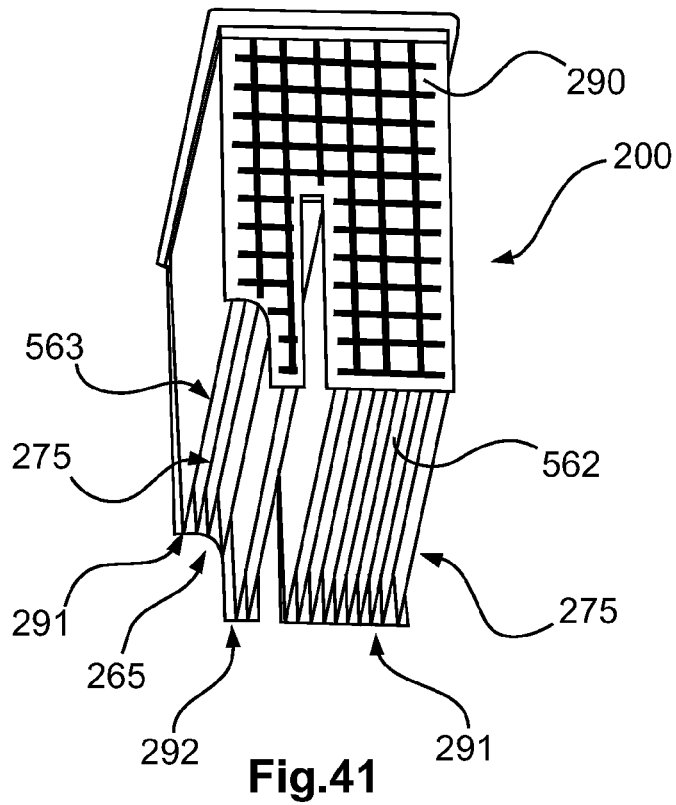
FIG. 41 is an isometric depiction of an air filter element according to an exemplary embodiment of the invention.

FIG. 41 is an isometric depiction of an air filter element 200 for an air filter of the kind shown in FIGS. 39 and 40. It is clearly evident that the envelope 265 of the upstream surface 275 and of the support element 290 has a rounded shape in the vicinity of the second dirty air chamber 563.

An air filter element 200 with a free volume 500 for the housing partition wall 561 makes it possible for the first dirty air chamber 562 and second dirty air chamber 563 to be partitioned off from each other by a housing partition wall 561 with a variable height (i.e. in a direction from the downstream surface to the upstream surface); the filter fold depth can be adapted to the height of the housing partition wall. As a result, the size of the first dirty air chamber 562 and the size of the second dirty air chamber 563 can be adapted to each other and the ratio of the sizes to each other can be optimized for the specific requirements.

In the vicinity of the second dirty air chamber 563, the support element 290 has a first retaining surface 291 and a second retaining surface 292; the support element 290 between the first retaining surface 291 and the second retaining surface 292 has a rounded transition or rounded shape.

In the vicinity of the first dirty air chamber 562, the support element has only a first retaining surface 291.

Figure 42:
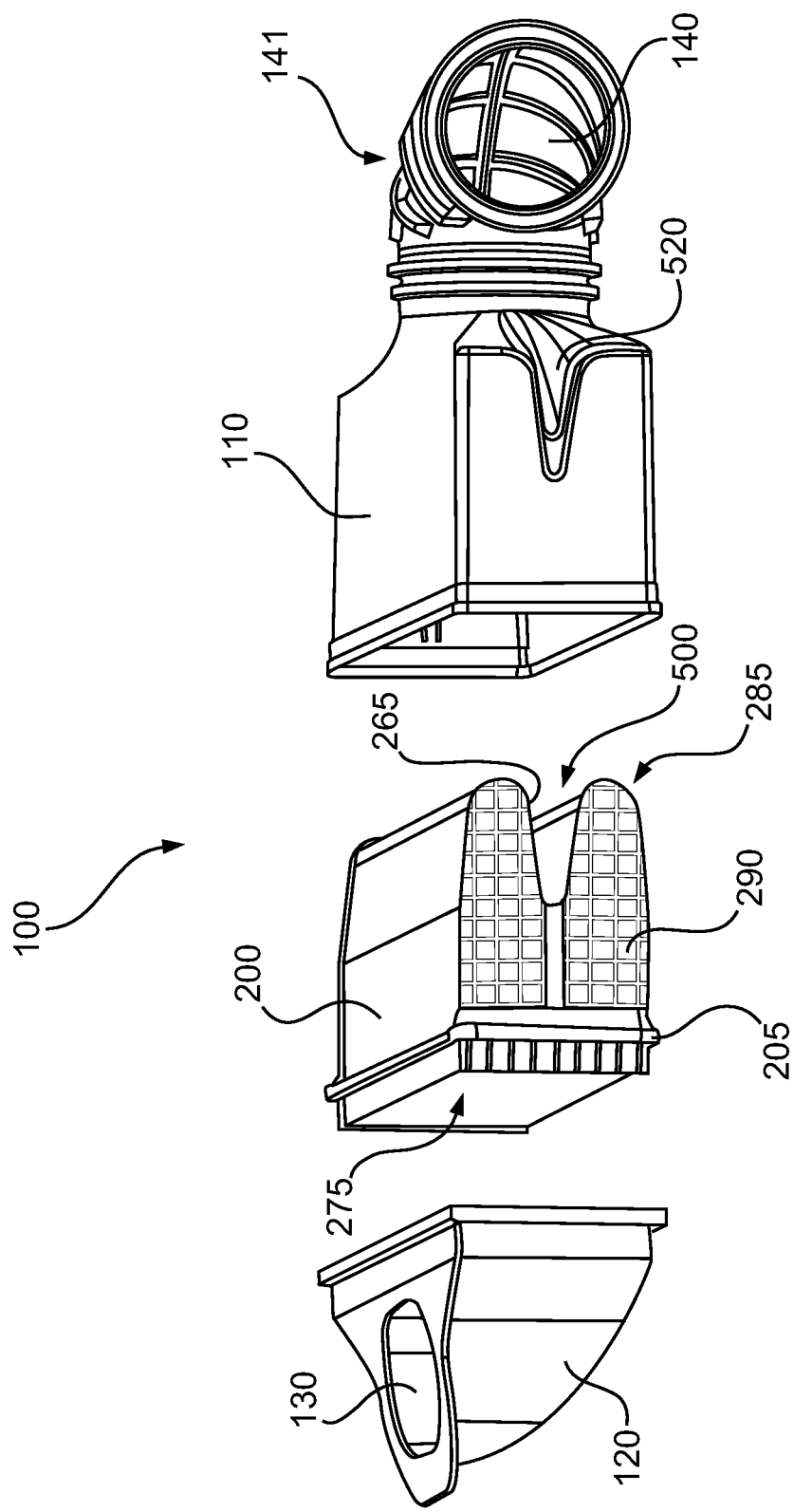
FIG. 42 is an isometric depiction of an air filter with a housing cover, an air filter element, and a housing body according to an exemplary embodiment of the invention.

FIG. 42 is an isometric depiction of an air filter 100 with a housing cover 120, an air filter element 200, and a housing body 110. The housing cover 120 has an inflow opening 130; the housing cover deflects the air flow from the inflow opening toward the upstream surface 275. The flow direction of the air flow through the inflow opening 130 is parallel to the upstream surface 275 and must be correspondingly deflected by the housing cover. The housing body 110 has a housing rib 520 and an outflow opening 140 at an outflow fitting 141.

The housing rib 520 can provide stability to the housing body, but the provision of the housing rib 520 can also be dictated by other requirements of the installation space for the air filter 100.

The air filter element 200 has a support element 290 and circumferential seal 205. The air filter element 200 also has a flat upstream surface 275 as well as a downstream surface 285; the envelope 265 of the fold edges at the downstream surface 285 forms a free volume; the free volume is adapted to the housing ribs 520 and its shape or the envelope of the downstream surface, for example, has a parabolic shape.

Like the housing cover, which is embodied to deflect the flow direction of the air flow on the upstream side, i.e. from the inflow opening 130 to the upstream surface 275, the outflow fitting 141 is likewise embodied to deflect the flow direction of the air flow on the downstream side, i.e. from the downstream surface 285 to the outflow opening 140.

It should be noted that an air flow deflection of any kind can be provided on both the downstream side and the upstream side.

Figure 43:
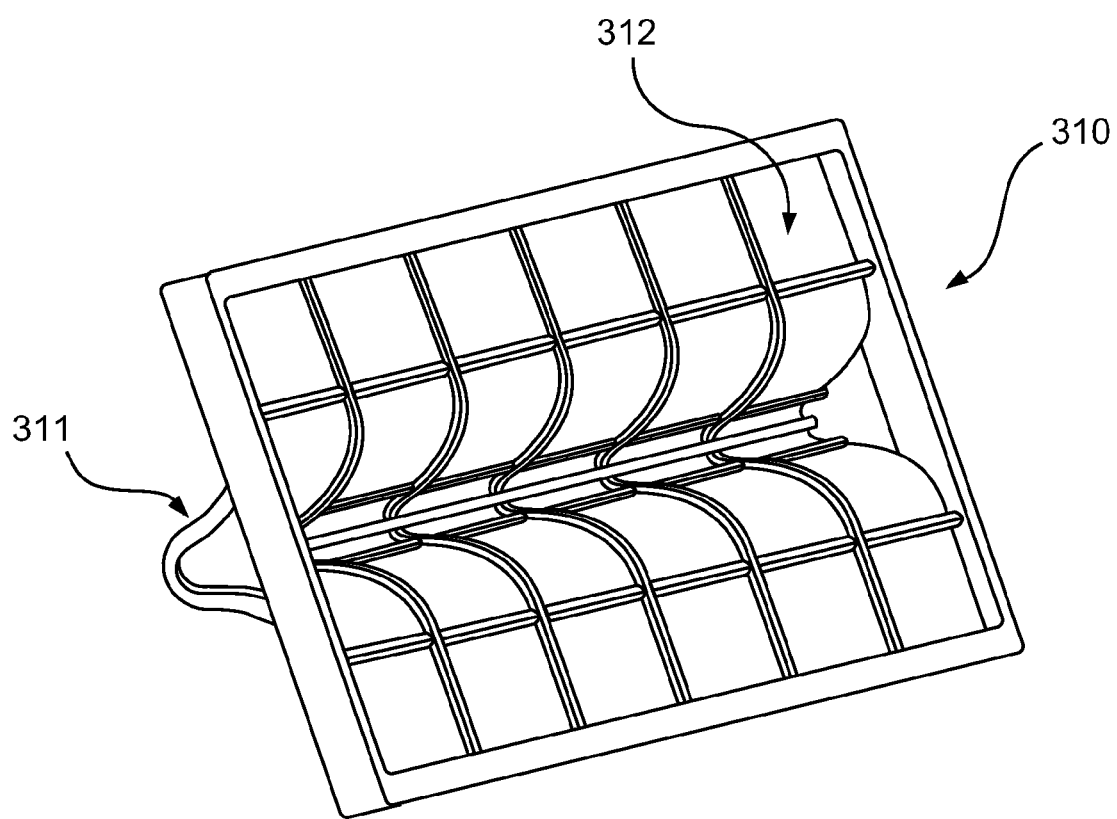
FIG. 43 shows an isometric depiction of an additional filter element for an air filter according to an exemplary embodiment of the invention.

FIG. 43 shows a functional component 300, which is embodied to be used with the air filter 100 from FIG. 42 and the corresponding main element 200 from FIG. 42.

The upstream surface 311 of the functional component 300 or additional filter element 310 is embodied to correspond to the free volume 500 and the envelope 265 of the air filter element 200 in FIG. 43. Embodying the functional component in this way enlarges the upstream surface 311 and downstream surface 312 of the additional filter element 310, making it possible to increase the filter performance.

Figure 44:
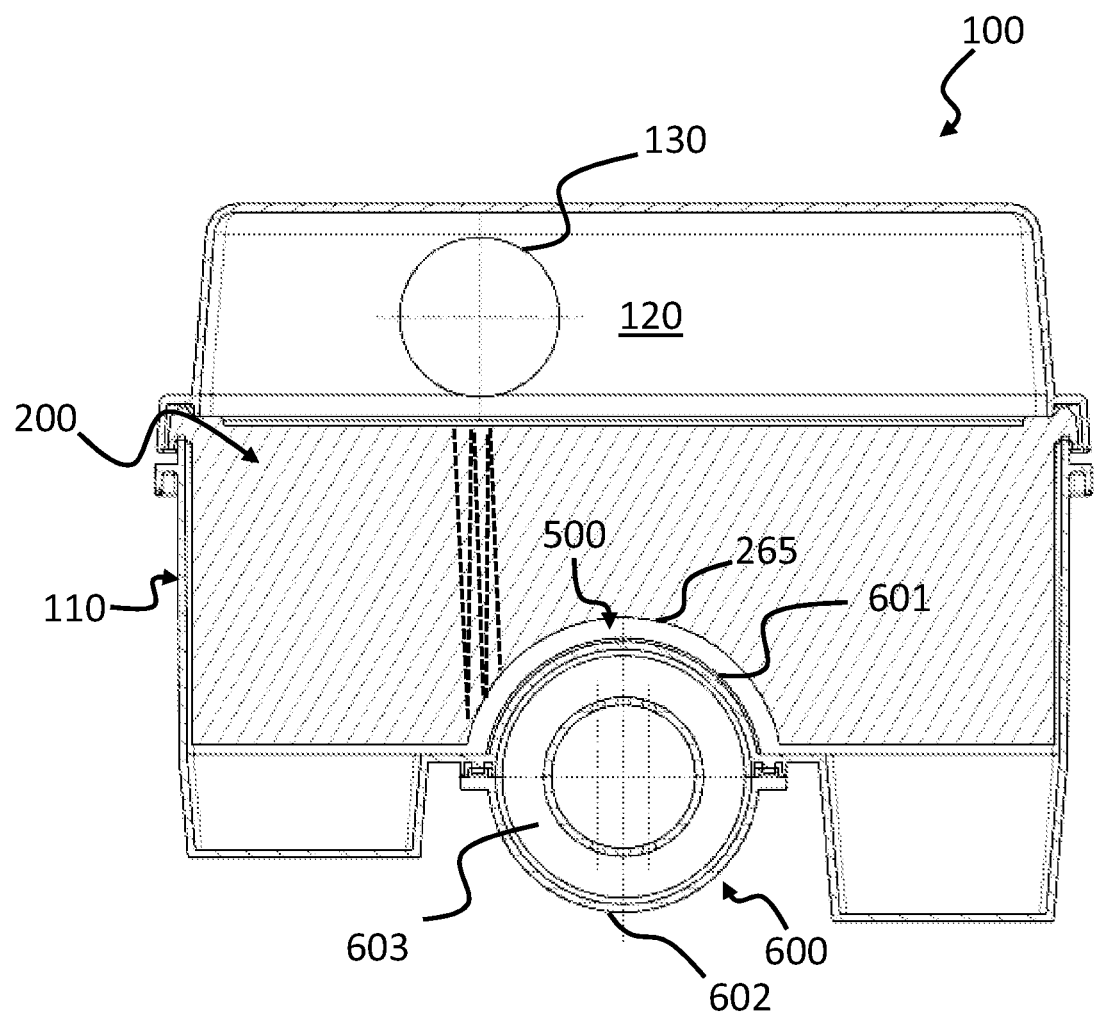
FIG. 44 shows a central sectional depiction of an air filter with a housing body, a housing cover, and an inserted filter element according to an exemplary embodiment of the invention.

FIG. 44 shows a central sectional depiction of an air filter 100 with a housing body 110, a housing cover 120, and an inserted filter element 200. A resonator 520, e.g. a broadband resonator or cavity resonator geometry 530, which is embodied to reduce flow noise of the air flowing through, is accommodated in a space-saving way. The flow passes through the resonator 530 perpendicular to the plane of the drawing in FIG. 44. The resonator is situated in the free volume 500 extending along the envelope 265 at the downstream surface of the air filter element 200. The resonator 530 is enclosed by an outer casing 600 or resonator housing. A part 601 of the outer casing 600 oriented toward the filter element 200 is formed by a part of the housing wall. A part 602 of the outer casing 600 is connected to the housing wall, e.g. by means of welding. A resonator insert piece 603 is contained in the outer casing 600.

An air filter element 200 with filter folds of variable fold depths makes it possible to accommodate a resonator 520 in the housing body 110 and to simultaneously maximize the filter area of the filter medium of the air filter element 200. In FIG. 44 a few filter folds are schematically depicted with dashed lines. The fold edges 225, not shown, therefore extend perpendicular to the plane of the drawing in FIG. 44 and thus parallel to the direction of the flow through the resonator 530.

The free volume 500 is adapted to the spatial dimensions of the resonator 520. In addition, i.e. in a region of the housing body 110 that is not occupied by the resonator 520, the filter folds of the air filter element 200 have an unreduced filter fold depth, so that the mounting of the resonator 520 on the housing body 110 reduces the filter area of the filter medium by only a minimal amount.

Figure 45:
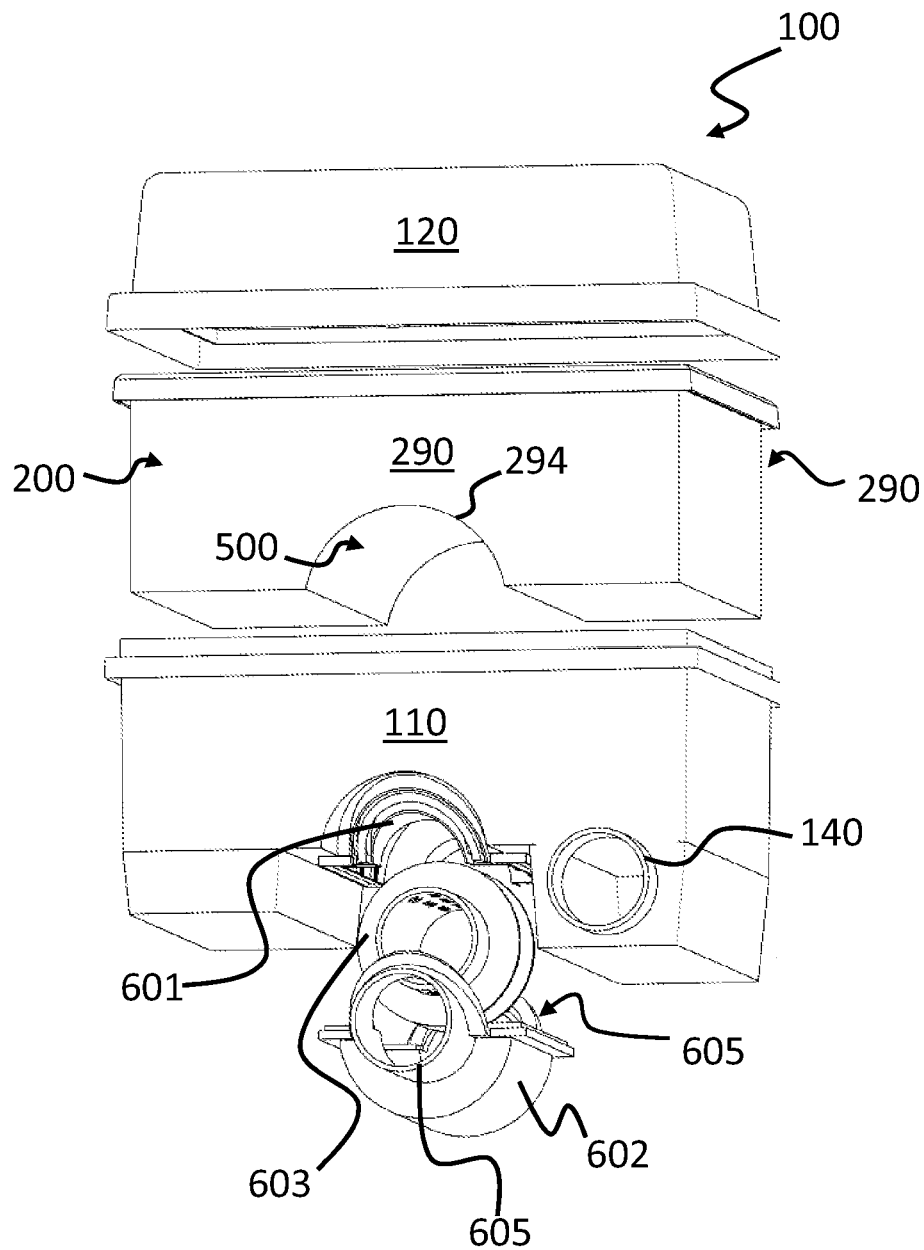
FIG. 45 shows an exploded view of the components of the air filter shown in FIG. 44 according to an exemplary embodiment of the invention.

FIG. 45 shows an exploded view of the components of the air filter 100 shown in FIG. 44. The part 602 of the outer casing 600 or housing of the resonator 520 has a respective resonator connection 605 at each of its opposite ends. The air flows into the resonator 520 at one connection and flows back out again at the other connection 520. The air flow through the resonator 520 is separate from the air flow through the filter element 200. In addition to the resonator 520, the housing body 110 is provided with an outflow opening 140. At the opposite end, an inflow opening 130 is provided on the housing cover 120 (FIG. 44).

Preferably, the filter element 200 has a respective support structure 290, which is equipped with an indentation 294, at each of the opposite ends in the flow direction of the resonator 520.

The invention claimed is:

1. An air filter element comprising:
   a filter medium including:
   an upstream filter medium envelope defining an upstream surface relative to flow through direction, the flow through direction defining an axial direction;
   a downstream filter medium envelope defining a downstream surface arranged side of the filter medium relative to the upstream envelope;
   and
   a support structure arranged on and affixed onto at least one lateral side of the filter medium and extending between the upstream surface to the downstream surface;
   wherein the filter medium extends between the upstream surface and the downstream surface;
   the filter medium is laterally fastened to the support structure between the upstream surface and downstream surface;
   wherein the support structure has a support structure depth in the flow direction that varies across the support structure along an upstream edge or a downstream edge of the support structure, the support structure depth defined as a varying distance from the upstream edge to the downstream edge;
   wherein in a plane in which the support structure extends, the support structure has a recessed offset in the form of an indentation or cutout which opens completely through the support structure from an exterior side to an interior side of the support structure, the indentation or cutout starting at the upstream edge or the downstream edge and continuing in the axial direction into an interior region of the support structure.

2. The air filter element according to claim 1, wherein the support structure covers the filter medium laterally along the recessed offset.

3. The air filter element according to claim 1, wherein the support structure has at least one retaining surface, which absorbs a retaining force in the direction along the plane (293) in which the support structure extends.

4. The air filter element according to claim 1, wherein the support structure has a first retaining surface and a second retaining surface which absorb a retaining force in the direction along the plane in which the support structure extends and
the recessed offset is embodied between the first retaining surface and second retaining surface of the support structure.

5. The air filter element according to claim 1, wherein the support structure has a third retaining surface, which is situated in the recessed offset and which absorbs a retaining force in the direction along the plane in which the support structure extends.

6. The air filter element according to claim 1, wherein the upstream or downstream surface of the filter medium that is associated with the recessed offset extends into a region lateral to the recessed offset.

7. The air filter element according to claim 1, wherein the upstream or downstream surface of the filter medium that is associated with the recessed offset has a one-dimensional concave or convex form in at least some sections and
the curvature of the concave or convex form corresponds in at least some sections to that of at least a part of the recessed offset.

8. The air filter element according to claim 1, wherein the filter medium is a filter medium composed of folds;
the folds each have a first fold leaf and second fold leaf, which respectively adjoin each other with a fold leaf edge at a fold edge and the first fold leaves of adjacent folds are oriented essentially parallel to each other;
the first and second fold leaves extend between the upstream surface and downstream surface; and
wherein the support structure supports the fold leaves laterally at the fold leaf edges that do not adjoin fold leaf edges of respectively adjacent filter leaves.

9. The air filter element according to claim 8, wherein the fold leaves are laterally embedded in the support structure at the fold leaf edges that do not adjoin fold leaf edges of respectively adjacent filter leaves.

10. The air filter element according to claim 8, wherein the upstream or downstream surface associated with the recessed offset has a shape that corresponds to at least a part of the recessed offset of the support structure in that a plurality of folds with varying fold depths are provided.

11. The air filter element according to claim 10, wherein at least part of the plurality of folds with varying fold depths are produced from a continuous filter medium web.

12. The air filter element according to claim 8, wherein adjacent fold leaves are reciprocally stabilized by means of at least one spacer device, which extends parallel to the fold leaf edges that do not adjoin fold leaf edges of respectively adjacent filter leaves.

13. An air filter with an air filter housing and an air filter element according to claim 1, wherein
the air filter housing has a first air flow opening and an air filter element receptacle;
the air filter element receptacle has a retaining surface recess; and
the retaining surface recess is in contact with at least a region of the support structure in a manner that transmits a retaining force.

14. The air filter according to claim 13, wherein
the retaining surface recess engages with at least one retaining surface on the support structure with at least one of the first, second, and third retaining surfaces on the support structure, in such a way that the engagement absorbs a retaining force in the direction along the plane in which the flat support structure extends.

15. The air filter according to claim 13, wherein
the air flow opening of the air filter housing at least partially feeds into the recessed offset of the support structure.

16. The air filter according to claim 13, wherein
the air filter housing has a protrusion and
the recessed offset engages in a position-establishing fashion with the protrusion in the air filter housing.

17. The air filter according to claim 13, wherein
the air filter has a functional component that protrudes into the recessed offset.

* * * * *